United States Patent
Kawamura

(10) Patent No.: US 8,730,320 B2
(45) Date of Patent: May 20, 2014

(54) LIGHTING APPARATUS

(75) Inventor: Ryo Kawamura, Katsushikaku (JP)

(73) Assignee: Panasonic Corporation, Osaka (JP)

( * ) Notice: Subject to any disclaimer, the term of this patent is extended or adjusted under 35 U.S.C. 154(b) by 1046 days.

(21) Appl. No.: 12/682,855

(22) PCT Filed: Oct. 9, 2008

(86) PCT No.: PCT/JP2008/068331
§ 371 (c)(1),
(2), (4) Date: Apr. 13, 2010

(87) PCT Pub. No.: WO2009/051054
PCT Pub. Date: Apr. 23, 2009

(65) Prior Publication Data
US 2010/0225748 A1 Sep. 9, 2010

(30) Foreign Application Priority Data

Oct. 17, 2007 (JP) ................................. 2007-270175

(51) Int. Cl.
*H04N 7/00* (2011.01)

(52) U.S. Cl.
USPC ............................................ 348/131; 348/51

(58) Field of Classification Search
USPC .................. 353/69, 79; 351/51, 131
See application file for complete search history.

(56) References Cited

U.S. PATENT DOCUMENTS

| | | | |
|---|---|---|---|
| 6,554,431 B1 | 4/2003 | Binsted et al. | |
| 7,001,023 B2 * | 2/2006 | Lee et al. | 353/69 |
| 7,002,589 B2 * | 2/2006 | Deering | 345/581 |
| 7,068,274 B2 * | 6/2006 | Welch et al. | 345/426 |
| 8,195,006 B2 | 6/2012 | Klemmer et al. | |
| 2002/0024640 A1 | 2/2002 | Ioka | |
| 2006/0038965 A1 | 2/2006 | Hennes | |
| 2006/0266135 A1 | 11/2006 | Nishikawa et al. | |
| 2008/0095468 A1 | 4/2008 | Klemmer et al. | |

FOREIGN PATENT DOCUMENTS

| | | |
|---|---|---|
| JP | 05-249428 | 9/1993 |
| JP | 2000-352761 | 12/2000 |
| JP | 2006-338181 | 12/2006 |
| JP | 2007-028273 | 2/2007 |
| JP | 2007-036543 | 2/2007 |
| WO | 2006/024254 | 3/2006 |

OTHER PUBLICATIONS

Extended European Search Report from European Patent Office (E.P.O.), mailed Mar. 22, 2013, in counterpart European Patent Application.

(Continued)

*Primary Examiner* — William C Vaughn, Jr.
*Assistant Examiner* — Naod Belai
(74) *Attorney, Agent, or Firm* — Greenblum & Bernstein, P.L.C.

(57) ABSTRACT

Irradiation light LA and irradiation light LB, which are to be projected toward an irradiation target object from a plurality of irradiation light projection units, respectively, are corrected so as to be ached with outlines of the irradiation target object, which are viewed individually from the irradiation light projection units. In such a way, a surface of the irradiation target object is coated with irradiation light LA' and irradiation light LB', which are narrower in range than the irradiation light LA and the irradiation light LB. In such a way, the irradiation target object having an arbitrary shape is coated with the plural pieces of irradiation light with high accuracy.

10 Claims, 22 Drawing Sheets

(56) References Cited

OTHER PUBLICATIONS http://www.egghouse.com/gobo/about.htm. (Downloaded pages and translations provided).

http//www.ushiolighting.co.jp/product/productimage/pdf/d12.pdf. (Downloaded pages and translations provided).
Applicant provided Download date Jul. 8, 2010. No particular author. see interview summary.

* cited by examiner

IRRADIATION LIGHT PROJECTION RANGE

3

LIGHTING APPARATUS

TECHNICAL FIELD

The present invention relates to a coating lighting apparatus that irradiates irradiation light onto an object as an irradiation target having an arbitrary shape so as to cover a surface thereof.

BACKGROUND ART

Heretofore, in a lighting apparatus that irradiates irradiation light having an arbitrary shape, a filter called a gobo or a mask is installed to a projection instrument, and a projected portion onto which the irradiation light is emitted from the projection instrument is shaded. In such a way, the irradiation light that has passed through the filter turns to a state of being clipped into a specific shape. Specifically, in a conventional lighting system, a filter (such as the gobo) clipped into a base shape composed of a circle, a triangle, a square or the like is attached to the projection instrument, and a shape is given to an outline of the irradiation light.

Moreover, in the conventional lighting system, in the case where the irradiation light is desired to be irradiated only onto an object as an irradiation target, after a projection position of the irradiation light emitted from the projection instrument is aligned to a position of the object as the irradiation target, an operation is performed, which is to match a rough outline of the irradiation light with a shape of the object as the irradiation target by a diaphragm function and zoom function of the projection instrument.

Furthermore, heretofore, there has been a lighting system called a moving projector that performs space direction by using a projector, which is the projection instrument, in place of a lighting appliance (a light). The space direction is as described in Non-Patent Literatures 1 and 2 (http://www.eg-ghouse.com/gobo/about.htm, and http://www ushiolighting-.co.jp/product/productimage/pdf/dl2.p df). This moving projector emits video light as the irradiation light. Therefore, the moving projector is capable of freely setting the shape and color of the irradiation light, and changing the irradiation light as a moving picture.

However, even in this lighting system, in the case of giving the shape to the irradiation light, in a similar way to the conventional lighting system, there is adopted a technique for roughly matching the outline of the irradiation light with the shape of the object as the irradiation target by using mask processing for superimposing the base shape on a video.

Still further, heretofore, a technology described in Japanese Patent Laid-Open No. 2006-338181 has been known as a stereoscopic display device capable of effectively expressing a surface texture of an object on a three-dimensional shape model.

However, in the above-mentioned conventional lighting system, a shape filter, a diaphragm and a zoom, which are prepared in advance, are used, and accordingly, the shape of the irradiation light can only be roughly matched with the object as the irradiation target. Moreover, in the mask processing for superimposing the base shape on the video, the base shape is formed in conformity with the shape of the object as the irradiation target, whereby highly accurate shape matching is possible. However, the base shape is formed into a two-dimensional shape. Therefore, in the case of viewing the object as the irradiation target having the arbitrary shape in different directions, it is necessary to use different base shapes, and it is difficult to divert the mask processing to a technology for simultaneously projecting plural pieces of the irradiation light toward the object as the irradiation target by a plurality of the projection instruments installed at different positions.

In this connection, the present invention has been proposed in consideration of the above-mentioned actual circumstances. It is an object of the present invention to provide a lighting apparatus capable of coating the object as the irradiation target having the arbitrary shape with the irradiation light with high accuracy.

DISCLOSURE OF THE INVENTION

The present invention is a lighting apparatus that projects irradiation light toward an irradiation target object having an arbitrary shape, including: a plurality of irradiation light projecting means for projecting the irradiation light onto the irradiation target object; irradiation light signal inputting means for receiving an irradiation light signal; coating correcting means for correcting the irradiation light signal received by the irradiation light signal inputting means so that the irradiation target object can be coated with the irradiation light when the irradiation light is irradiated onto the irradiation target object; and irradiation light generating means for generating irradiation light by using the irradiation light corrected by the coating correcting means, and projecting the irradiation light from the irradiation light projecting means. In order to solve the above-mentioned problem, in the lighting apparatus having such a configuration as described above, the coating correcting means includes first irradiation light signal correcting means for correcting the irradiation light signal for each of the irradiation light projecting means in accordance with an outline of the irradiation target object, and correcting the irradiation light signal so as to coat the irradiation target object in many directions with the irradiation light irradiated from the plurality of irradiation light projecting means, the outline being viewed from each of the irradiation light projecting means and based on an irradiation target object parameter including a three-dimensional shape, position and posture of the irradiation target object and on an irradiation light projection parameter including a position and posture of each of the irradiation light projecting means, and the irradiation light generating means generates plural pieces of the irradiation light by using the irradiation light signal for each of the irradiation light projecting means, the irradiation light signal being corrected by the first irradiation light signal correcting means.

BRIEF DESCRIPTION OF THE DRAWINGS

FIGS. 9(a) and 8(b) are views explaining a video visually recognized by the user when a dome-like object as the irradiation target is viewed from the user in the lighting system to which the present invention is applied.

BEST MODE FOR CARRYING OUT THE INVENTION

A description will be made below of embodiments of the present invention with reference to the drawings.

Figure 1:
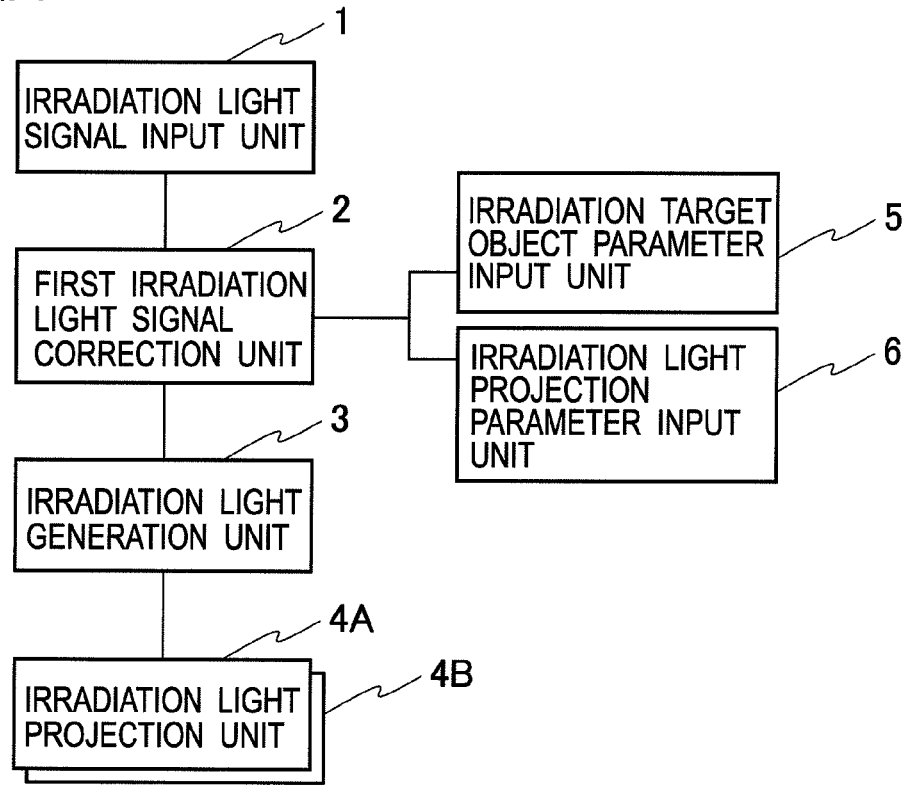
FIG. 1 is a block diagram showing a functional configuration of a lighting apparatus to which the present invention is applied.

The present invention is applied to a lighting apparatus, for example as shown in FIG. 1, including: an irradiation light signal input unit 1, a first irradiation light signal correction unit 2, and an irradiation light generation unit 3, which are composed of a personal computer and the like; a plurality of irradiation light projection units 4A and 4B (hereinafter, simply referred to as "irradiation light projection units 4" in the case of being generically referred to) composed of projectors and the like; and an irradiation target object parameter input unit 5 and an irradiation light projection parameter input unit 6, which are composed of a variety of interfaces. Note that, in the following description, the case where the number of irradiation light projection units 4 is two will be described; however, it is a matter of course that a larger number of the irradiation light projection units 4 may be used. Note that, though the lighting apparatus shown in FIG. 1 is composed of hardware made of a computer including a CPU, a ROM, a RAM, a storage device and the like, the lighting apparatus will be described for each of functional blocks for the sake of convenience with reference to FIG. 1.

Figure 2:
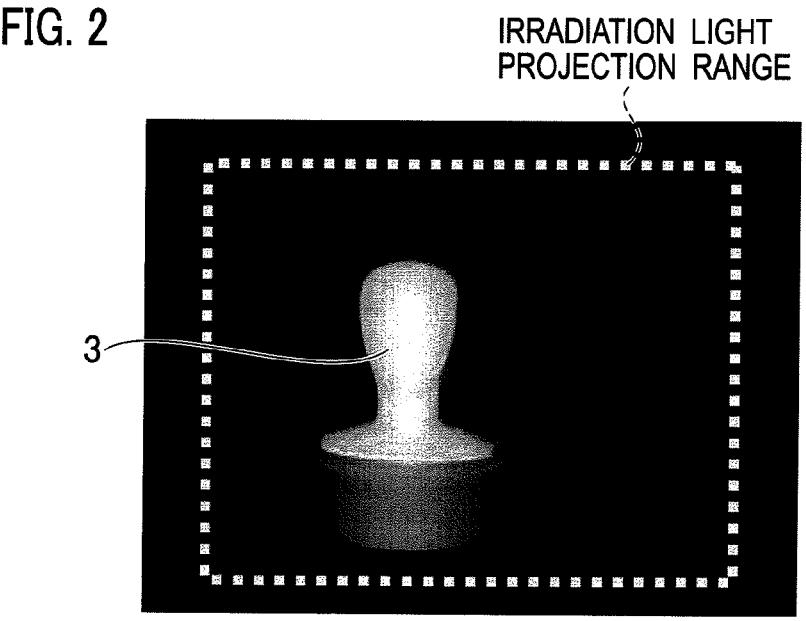
FIG. 2 is a view showing a state where an object as an irradiation target having an arbitrary shape is coated by the lighting apparatus to which the present invention is applied.

This lighting apparatus projects plural pieces of irradiation light toward an irradiation target object having an arbitrary shape. In such a way, the lighting apparatus allows the irradiation target object to be observed as if the plural pieces of irradiation light coated the irradiation target object as shown in FIG. 2. Moreover, the lighting apparatus may coat the irradiation target object with plural-colored irradiation light or video irradiation light as well as monochromatic irradiation light. In such a way, the lighting apparatus realizes multi-projection toward a large irradiation target object and three-dimensional coating of coating the irradiation target object in many directions.

Figure 3:
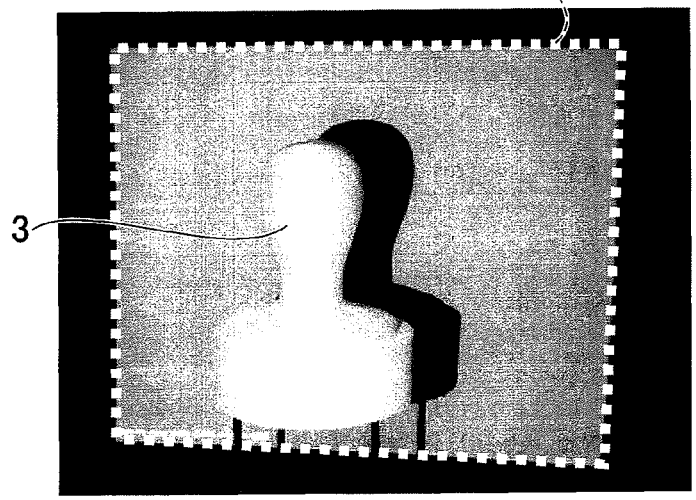
FIG. 3 is a view showing a state where light is irradiated onto the entirety of an irradiation light projection range.

In usual, when the monochromatic irradiation light is emitted from a certain projector toward the entirety of an irradiation light projection range, then as shown in FIG. 3, the irradiation light is also irradiated onto a region other than the irradiation target object, and a shadow is cast behind the irradiation target object. As opposed to this, as shown in FIG. 2, the lighting apparatus projects the plural pieces of irradiation light only onto a surface of the irradiation target object, and projects irradiation light of a background color onto a background of the irradiation target object. In such a way, the lighting apparatus coats the irradiation target object with the plural pieces of irradiation light. Note that, in the following description, the irradiation light for coating the irradiation target object as shown in FIG. 2 is referred to as "coating light", and the irradiation light that becomes the background of the irradiation target object is referred to as "background light".

Figure 4:
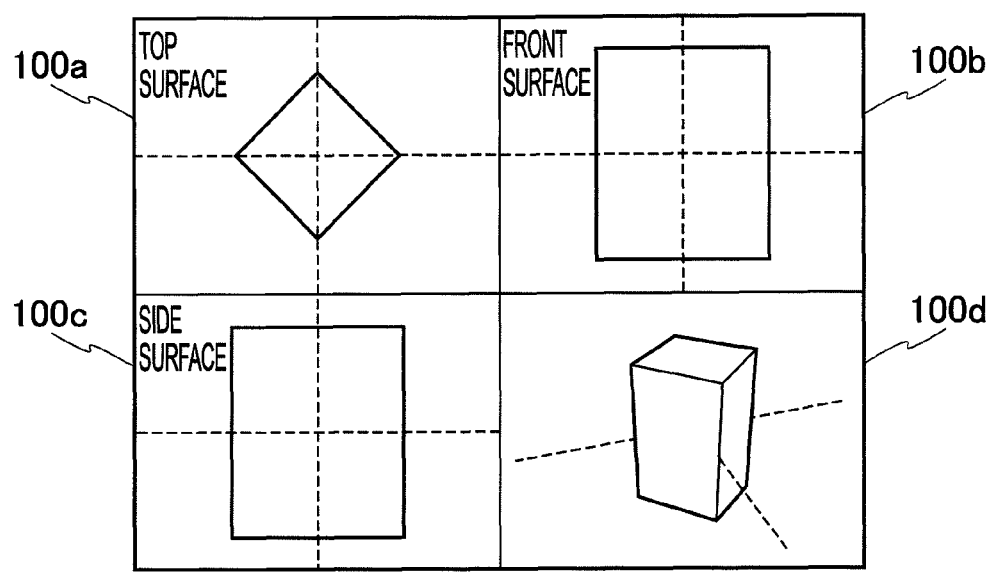
FIG. 4 is a view showing shape data of the object as the irradiation target.

The irradiation target object is a three-dimensional object having an arbitrary shape as shown in FIG. 4. By a computer graphic technology, this irradiation target object is analyzed, for example, as top surface shape data 100*a* indicating a top surface shape, front surface shape data 100*b* indicating a front surface shape, side surface shape data 100*c* indicating a side surface shape, and arbitrary angle shape data 100*d* indicating a shape viewed at an arbitrary angle. Note that, by the computer graphic technology, the irradiation target object may be analyzed not only for the above-mentioned front surface shape, side surface shape and top surface shape but also for a back surface shape. The shape data on the respective surfaces of the irradiation target object is supplied from the irradiation target object parameter input unit 5 to the first irradiation light signal correction unit 2, and is used for correction processing in the first irradiation light signal correction unit 2, which will be described later.

As will be described later, in order to coat the irradiation target object with the irradiation light, the lighting apparatus implements the correction processing for an irradiation light signal, and outputs the irradiation light from the plurality of irradiation light projection units 4. Hence, the irradiation target object is not particularly limited, and may be an irregular object or a space composed of even flat surfaces (or curved surfaces). Moreover, the irradiation target object may be any as long as it composes a house and is exposed. For example, the irradiation target object includes a wall, a floor, a ceiling, a variety of appliances of a bathroom, and the like. However, in order to enhance reproducibility of a tone of the irradiation light projected from the irradiation light projection units 4, it is desirable that the surface of the irradiation target object be processed by a screen material and the like.

The irradiation light signal input unit 1 receives the irradiation light signal, and supplies the received irradiation light signal to the first irradiation light signal correction unit 2. The irradiation light signal input unit 1 may receive the irradiation light signal from an external personal computer, or may generate a monochromatic irradiation light signal by designating a color of monochromatic light. Moreover, this irradiation light signal is generated as a two-dimensional video.

With regard to this irradiation light signal, for example, in the case of using monochromatic lighting light as the coating light, the entirety of the irradiation light projection range is a monochromatic video signal. Moreover, also in the case where the irradiation light signal input unit 1 uses, as the coating light, irradiation light including a pattern image or video with a plurality of colors, the entirety of the irradiation light projection range is a video signal including the pattern image or the video. The irradiation light signal received or generated by the irradiation light signal input unit 1 is supplied to the first irradiation light signal correction unit 2.

The irradiation light generation unit 3 generates the irradiation light in accordance with the irradiation light signal for each of the irradiation light projection units 4A and 4B, which is supplied thereto from the first irradiation light signal correction unit 2, and allows the irradiation light projection units 4A and 4B, each of which includes an optical system, to project the irradiation light. Each of the irradiation light projection units 4A and 4B is composed of a projector, which receives the irradiation light signal transmitted from the first irradiation light signal correction unit 2 through the irradiation light generation unit 3, and emits the irradiation light composed of the coating light and the background light.

The first irradiation light signal correction unit 2 performs processing for correcting the irradiation light signal, which is received by the irradiation light signal input unit 1, so that the irradiation target object can be coated with the irradiation light when the plural pieces of irradiation light are irradiated onto the irradiation target object. Specifically, the first irradiation light signal correction unit 2 acquires, from the irradiation target object parameter input unit 5, an irradiation target object parameter including a three-dimensional shape, position and posture of the irradiation target object, and acquires, from the irradiation light projection parameter input unit 6, an irradiation light projection parameter including a position and posture of each of the irradiation light projection units 4A and 4B. Then, based on the irradiation target object parameter and the irradiation light projection parameter, the first irradiation light signal correction unit 2 corrects the irradiation light signal for each of the irradiation light projection units 4A and 4B in accordance with an outline of the irradiation target object viewed from each of the irradiation light projection units 4A and 4B. In this correction processing for the irradiation light signal, the irradiation light signal is corrected so that the irradiation target object can be coated in many directions with the irradiation light irradiated from the plurality of irradiation light projection units 4A and 4B. In other words, the first irradiation light signal correction unit 2 corrects a plurality of the irradiation light signals so that outlines of the coating light included in the plural pieces of irradiation light can coincide with the outline of the irradiation target object.

First, the first irradiation light signal correction unit 2 corrects each of the irradiation light signals so as to cut the outline of the coating light included in the irradiation light in conformity with the shape of the irradiation target object. In such a way, the first irradiation light signal correction unit 2 performs cutting processing for an irradiation range of the coating light so as to project the coating light only onto the irradiation target object, and to project the background light onto the region other than the irradiation target object.

Specifically, as will be described below, the first irradiation light signal correction unit 2 performs mapping processing for mapping the two-dimensional video only on the irradiation target object having the arbitrary shape, and leaving the portion other than the irradiation target object as an unmapped video.

Figure 5:
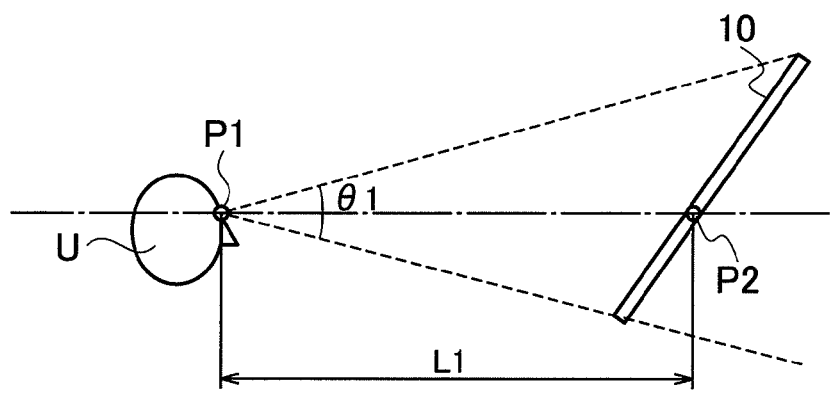
FIG. 5 is a view showing an eye-point position, viewing angle and distance of a user with respect to a flat object as the irradiation target in a lighting system to which the present invention is applied.

For example as shown in FIG. 5, as the irradiation target object 10 having the arbitrary shape, a flat object 10 is considered, which is spaced from a user U by a distance L, and is arranged so as to be inclined obliquely with respect to the user U. This flat object 10 is visually recognized from a viewpoint position 21 of the user U at a viewing angle θ1. The user U and a point P2 on the flat object 10, which intersects a center of a field of view of the user U, are spaced from each other by a distance L1.

Figure 6:
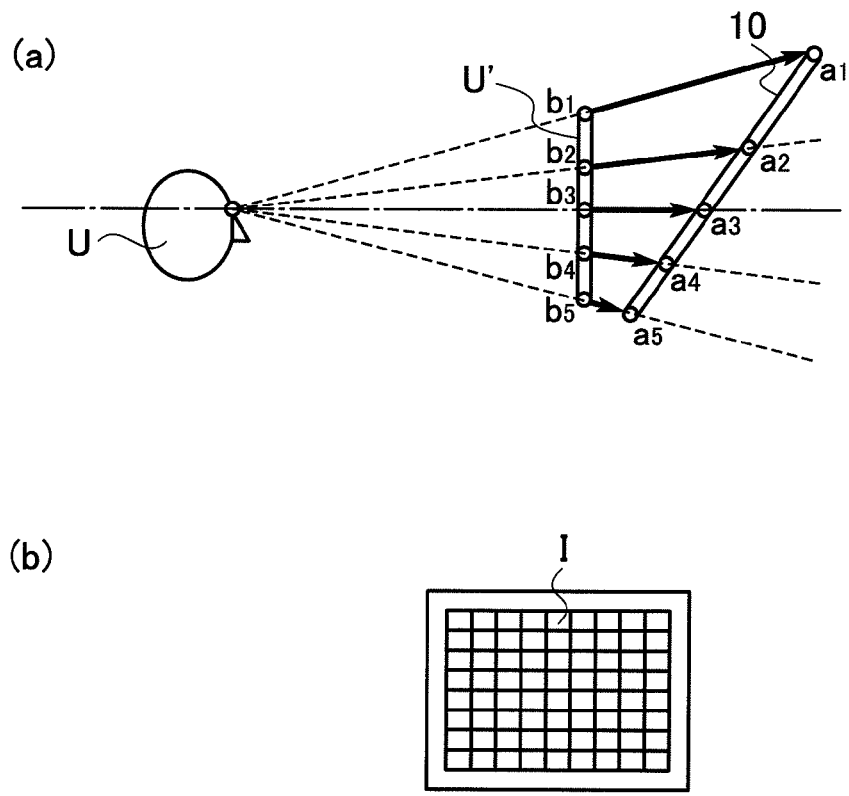
FIGS. 6(*a*) and 6(*b*) are views explaining a video visually recognized by the user when the flat object as the irradiation target is viewed from the user in the lighting system to which the present invention is applied.

In a positional relationship between the viewpoint position 21 and the point P2 on the flat object 10, there is considered the case of viewing a grid-like two-dimensional image I (coating light) shown in FIG. 6(b) on the flat object 10 through a video surface U' viewed from the user U as shown in FIG. 6(a). In this case, in the case of displaying, on the flat object 10, the same video as a video in which the two-dimensional video I shown in FIG. 6(b) is displayed on the video surface U', it is necessary to acquire a correspondence relationship between each coordinate on the video surface U' and each coordinate on the flat object 10. Though schematically shown in FIG. 6(a), points b1, b2, b3, b4 and b5 on the video surface U' correspond to points a1, a2, a3, a4 and a5 on the flat object 10. Hence, videos displayed on the points a1, a2, a3, a4 and a5 on the flat object 10 are visually recognized as the points b1, b2, b3, b4 and b5 on the video surface U' from the user U.

Figure 7:
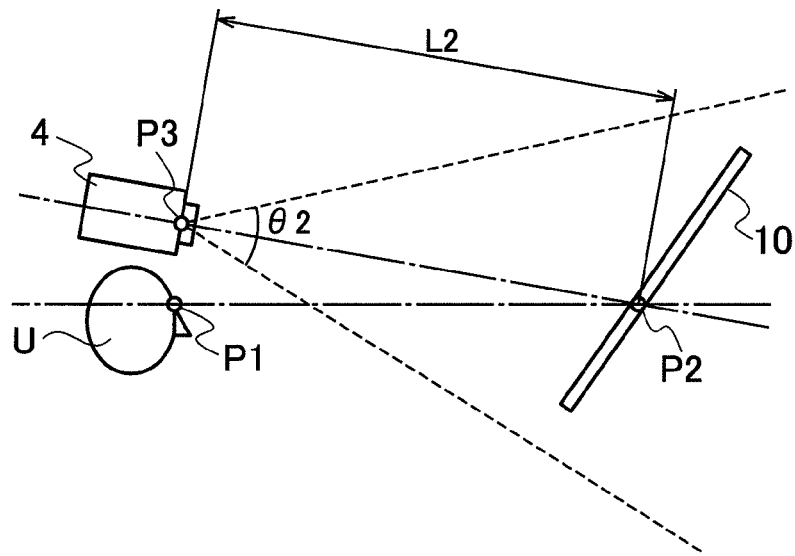
FIG. 7 is a view explaining a projection position, projection image angle and distance of an irradiation light projection unit with respect to the flat object as the irradiation target in the lighting system to which the present invention is applied.

Moreover, as shown in FIG. 7, the point P2 where a line of sight of the user U and the flat object 10 intersect each other and a projection position P3 of the irradiation light projection unit 4 are spaced from each other by a distance L2. Moreover, the irradiation light projection unit 4 projects the irradiation light within a range of a predetermined projection angle of view θ2.

Figure 8:
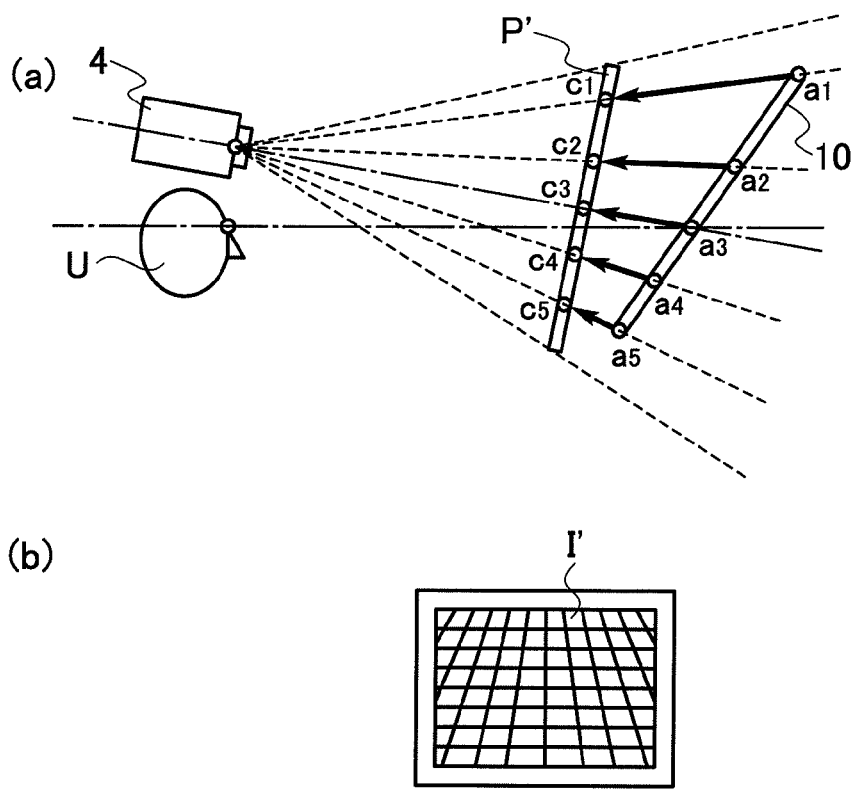
FIGS. 8(a) and 8(b) are views explaining a state where light is projected onto the flat object as the irradiation target from the irradiation light projection unit in the lighting system to which the present invention is applied.

In this case, with regard to a positional relationship between a video surface P' of the irradiation light projection unit 4 and the flat object 10, as shown in FIG. 8(a), the points a1, a2, a3, a4 and a5 on the flat object 10 correspond to points c1, c2, c3, c4 and c5 on the video surface P'. In other words, points on straight lines extended from the projection position P3 of the irradiation light projection unit 4 through the points c1, c2, c3, c4 and c5 on the video surface P' become the points a1, a2, a3, a4 and a5 on the flat object 30.

The viewpoint position P1 and viewing angle θ1 of the user U, the position of the flat object 10, and the projection position P3 and projection angle of view θ2 of the irradiation light projection unit 4 have the relationships thereamong as described above. Accordingly, when videos are projected onto the points c1, c2, c3, c4 and c5 on the video surface P' in the irradiation light projection unit 4 shown in FIG. 8(a), the videos are projected onto the points a1, a2, a3, a4 and a5 on the flat object 10. As a result, the points a1, a2, a3, a4 and a5 on the flat object 10 are visually recognized as the points b1, b2, b3, b4 and b5 on the video surface U' in FIG. 6(a). Hence, in order to allow the user U to visually recognize the two-dimensional video I, it is necessary for the irradiation light projection unit 4 to project a two-dimensional video I', which is distorted as shown in FIG. 8(b), based on a correspondence relationship between each coordinate on the flat object 10, which corresponds to each coordinate on the video surface U', and each coordinate on the flat object 10, which corresponds to each coordinate on the video surface P'.

In order to realize a projection operation of the lighting light, which is as described above, as shown in FIG. 5, the first irradiation light signal correction unit 2 acquires a viewpoint position/posture parameter that indicates a viewpoint position indicating the viewpoint position P1 of the user U and indicates a line-of-sight direction of the user U, and acquires a viewing angle parameter that indicates the viewing angle θ1 of the user U. These parameters of the user U determine the above-mentioned video surface U'.

Moreover, the first irradiation light signal correction unit 2 acquires shape data of the flat object 10 onto which the lighting light emitted from the irradiation light projection unit 4 is projected. This shape data is, for example, CAD data. Here, the viewpoint position/posture parameter is the one in which positions on X-, Y- and Z-axes and rotation angles about the axes in a three-dimensional coordinate space are numerically defined. This viewpoint position/posture parameter uniquely determine the distance L1 between the viewpoint position P1 and the flat object 10, and the posture of the flat object 10 with respect to the viewpoint position P1. Moreover, the shape data of the flat object 10 is the one in which a shape region in the three-dimensional coordinate space is defined based on electronic data created by CAD and the like. This shape data uniquely determine the shape of the flat object 10 viewed from the viewpoint position P1. The shape data of the flat object 10, which is as described above, and the parameters of the user U determine the correspondence relationship between the coordinate of the video surface U' and the coordinate of the flat object 10.

Furthermore, for the fact that the irradiation light projection unit 4 is installed as shown in FIG. 7, the first irradiation light signal correction unit 2 acquires a position/posture parameter that indicates the projection position P3 of the irradiation light projection unit 4 and an optical axis direction of the irradiation light projection unit 4 concerned, and acquires a projection angle-of-view parameter that indicates the projection angle of view θ2 of the irradiation light projection unit 4. These position/posture parameter and projection angle-of-view parameter of the irradiation light projection unit 4 indicate the video surface P' projected onto the flat object 10 by the irradiation light projection unit 4. When this video surface P' is determined, it is determined onto which coordinate of the flat object 10 the lighting light projected from the irradiation light projection unit 4 is projected through the video surface P'. In other words, the position/posture parameter and projection angle-of-view parameter of the irradiation light projection unit 4 and the position/posture parameter and shape data of the flat object 10 uniquely determine the range of the flat object 10 covered with the lighting light emitted from the irradiation light projection unit 4. In the case where the irradiation light projection unit 4 is the projector, the projection position P3 is defined by a back focus and specified projection angle thereof, and the projection angle of view θ2 is calculated from a horizontal and vertical projection range located apart from the projection position P3 by a fixed distance.

Then, the first irradiation light signal correction unit 2 arranges pixels on intersections (c1, c2, c3, c4, c5) between the video surface P] and the straight lines which connect the pixels (a1, a2, a3, a4, a5) of the lighting light displayed on the flat object 10 and the projection position P3 of the irradiation light projection unit 4 to each other, thereby composes the two-dimensional video I', and projects the two-dimensional video I' onto the flat object 10. Then, the user U can be allowed to visually recognize the video free from the distortion through such a route of the points c1, c2, c3, c4 and c5 on the video surface P', the points a1, a2, a3, a4 and a5 on the flat object 10, and the points b1, b2, b3, b4 and b5 on the video surface U'.

Figure 9:
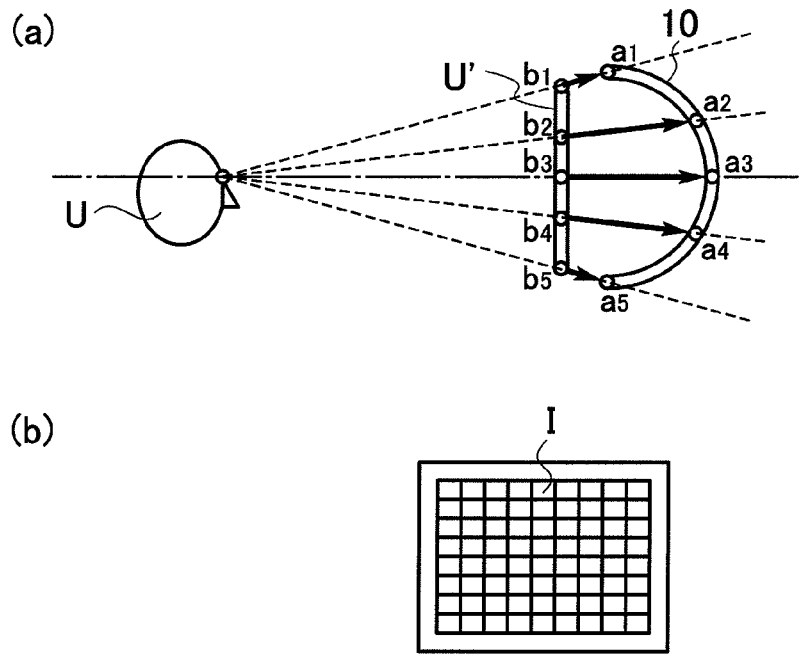
Figure 10:
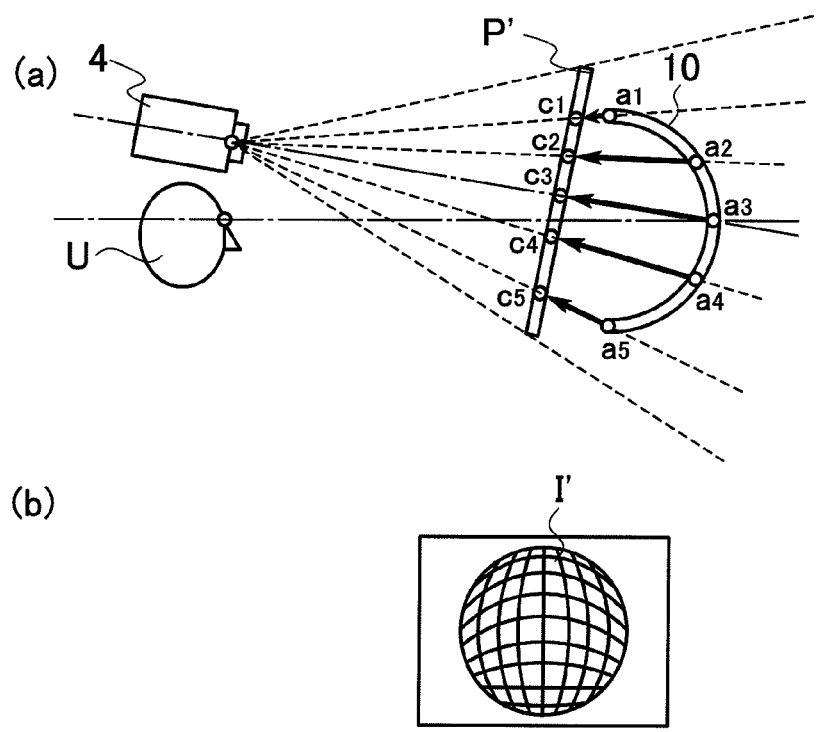
FIGS. 10(a) and 10(b) are views explaining a state where the light is projected onto the dome-like object as the irradiation target from the irradiation light projection unit in the lighting system to which the present invention is applied.

In a similar way, even if the irradiation target object 10 does not have such a shape of the flat object 10 but has an arbitrary shape such as a dome shape, such a dome-like irradiation target object 10 can be coated with the lighting light without distortion, and the user U can be allowed to visually recognize the irradiation target object 10 concerned. The case is considered, where the irradiation target object 10 is the dome-like object 10 as shown in FIG. 9($a$), and the user U can be allowed to visually recognize grid-like lighting light as shown in FIG. 9($b$). In this case, from the user U, visually recognized are points a1, a2, a3, a4 and a5 on the dome-like object 10, which are located on extensions of the points b1, b2, b3, b4 and b5 on the video surface U'. While the points a1, a2, a3, a4 and a5 are visually recognized as described above, the irradiation light projection unit 4 projects the irradiation light onto the video surface P' as shown in FIG. 10($a$). The irradiation light that has passed through the points c1, c2, c3, c4 and c5 on the video surface P' is projected onto the points a1, a2, a3, a4 and a5 on the dome-like object 10, and is visually recognized as the points b1, b2, b3, b4 and b5 on the video surface U' shown in FIG. 9($a$). Hence, the irradiation light projection unit 4 projects a two-dimensional video I', which is distorted as shown in: FIG. 10($b$), onto the video surface 502. While the irradiation light projection unit 4 projects the two-dimensional video I' as described above, the user U can visually recognize a two-dimensional video I without distortion as shown in FIG. 9($b$).

By performing the mapping processing as described above, the first irradiation light signal correction unit 2 can obtain a video, in which the two-dimensional video supplied from the irradiation light signal input unit 1 is mapped only onto the irradiation target object having the arbitrary shape, and is not mapped onto the portion other than the irradiation target object. The video thus subjected to the mapping processing becomes a video signal for projecting the coating light onto the irradiation target object by the first irradiation light signal correction unit 2. As opposed to the coating light, the background light becomes a video signal that becomes a video portion other than the video portion corresponding to the coating light.

Here, in the case of a correctly opposed state where a central axis of the projection range of each of the irradiation light projection units 4A and 4B and a center position (origin position) of the irradiation target object coincide with each other, the irradiation target object can be coated with the coating light with high accuracy by the irradiation light signal corrected by the above-described mapping processing. However, in the case where the origin position of the irradiation target object and the central axis of the projection range of each of the irradiation light projection units 4A and 4B are not correctly opposed to each other in terms of an arrangement relationship, sufficient correction cannot be performed only by the first irradiation light signal correction unit 2. Specifically, in the case where an optical axis of each of the irradiation light projection units 4A and 4B shifts from the origin position of the irradiation target object, it is necessary to correct the irradiation light signal by taking the position of each of the irradiation light projection units 4A and 4B as a parameter.

For this purpose, the lighting apparatus further performs correction processing for the irradiation light signal by the first irradiation light signal correction unit 2 in response to a relationship between the original position of the irradiation target object and the position of each of the irradiation light projection units 4A and 4B. This correction processing implements parallel displacement conversion and rotational displacement conversion for a video display parameter necessary in the event of video creation, and thereby changes the video display parameter. In this case, along the irradiation light projection range, the video display parameter is converted into a value asymmetric in the vertical and lateral direction, and the video display parameter is changed. In such a way, the lighting apparatus further corrects the outline of the coating light so that the coating light can be projected only onto the irradiation target object with high accuracy even if the irradiation light is projected in an arbitrary direction from each of the irradiation light projection units 4A and 4B onto the irradiation target object.

Specifically, the first irradiation light signal correction unit 2 acquires, in advance as correction parameters, the position of the irradiation target object, the position of each of the irradiation light projection units 4A and 4B and a posture parameter of the irradiation target object with respect to each of the irradiation light projection units 4A and 4B from the irradiation target object parameter input unit 5 and the irradiation light projection parameter input unit 6. Then, the first irradiation light signal correction unit 2 executes the parallel displacement conversion and the rotational displacement conversion based on the received parameters.

Moreover, it is desirable that the lighting apparatus correct the irradiation light signal by using an irradiation light projection parameter including performance of each of the irradiation light projection units 4A and 4B, such as the projection angle of view and optical axis shift amount of each of the irradiation light projection units 4A and 4B, as well as the positional relationship between each of the irradiation light projection units 4A and 4B and the irradiation target object.

Figure 11:
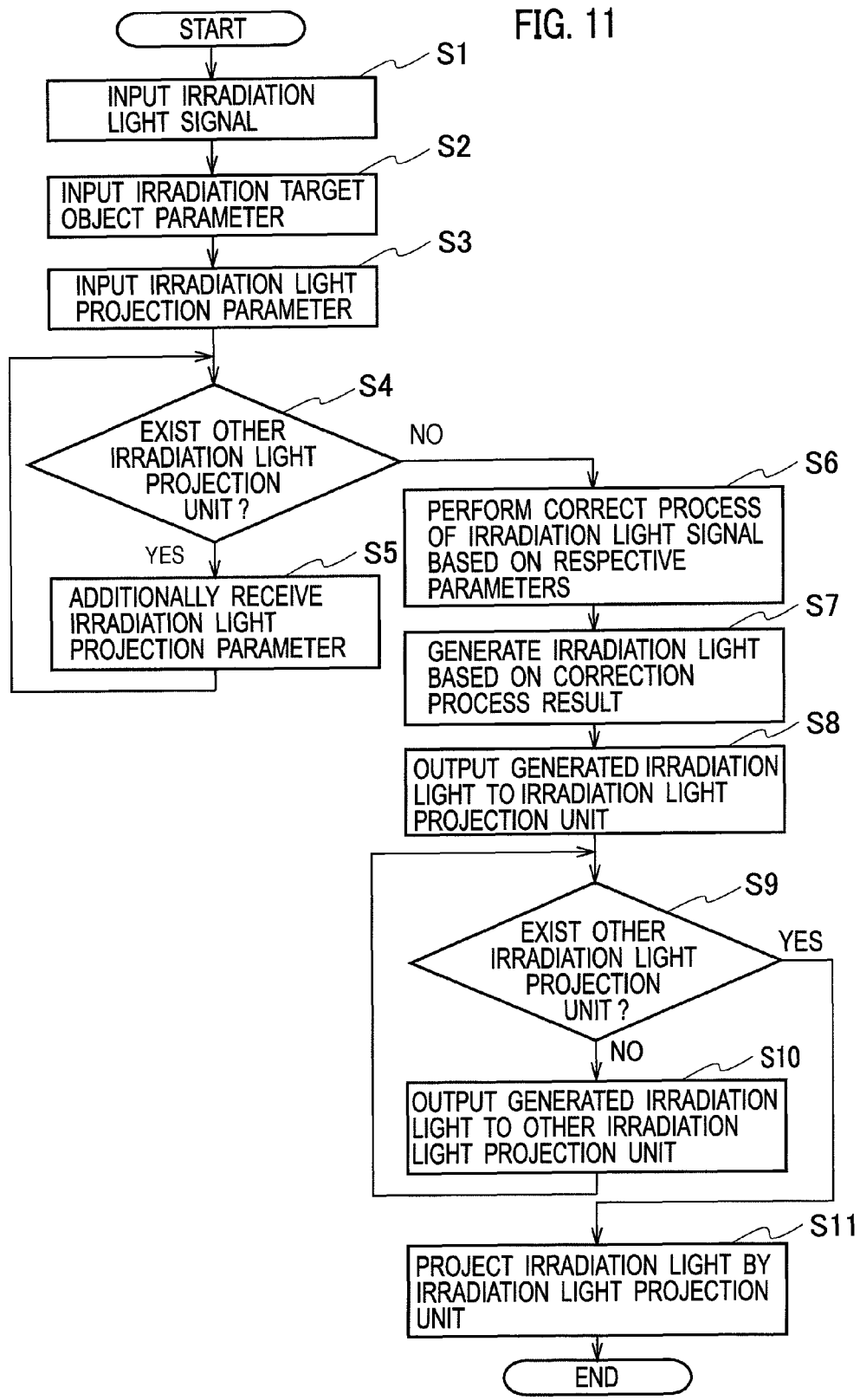
FIG. 11 is a flowchart showing an operation procedure of the lighting apparatus to which the present invention is applied.

Next, with reference to FIG. 11 and the like, a description will be made of an operation procedure when the irradiation light is irradiated onto the irradiation target object in a coating manner by each of the irradiation light projection units 4A and 4B in the above-mentioned lighting apparatus.

First, in Step S1, the irradiation light signal in which the color and brightness of the irradiation light are designated is received by the irradiation light signal input unit 1. In Step S2, the irradiation target object parameter including the three-dimensional shape, position and posture of the irradiation target object as shown in FIG. 4 is inputted by the irradiation target object parameter input unit 5. In step S3, the irradiation light projection parameter including the performance (angle of view, back focus, projection angle), position and posture of each of the irradiation light projection units 4A and 4B is received by the irradiation light projection parameter input unit 6.

Next, in Step S4, the irradiation light projection parameter received in Step S3 and the irradiation light projection units 4 existing at present are compared in number with each other by the first irradiation light signal correction unit 2. In such a way, the first irradiation light signal correction unit 2 determines whether or not no other irradiation light projection unit 4 that projects the irradiation light onto the irradiation target object exists. In the case where another irradiation light projection unit 4 exists, then in Step S5, the irradiation light projection parameter is additionally received from the irradiation light projection parameter input unit 6. In the case where no other irradiation light projection unit 4 exists, the processing proceeds to Step S6. For example, in the case where two irradiation light projection units 4A and 4B are provided as shown in FIG. 1, first, the irradiation light projection parameter of the irradiation light projection unit 4A is received in Step S3, and then in Step S5, the irradiation light projection parameter of the irradiation light projection unit 4B is received.

In Step S6, the irradiation light signal received in Step S1 is corrected by the first irradiation light signal correction unit 2 based on the irradiation light projection parameters received in Step S3 and Step S5 and on the irradiation target object parameter received in Step S2. The outline of the coating light included in the irradiation light is cut in accordance with the outline of the irradiation target object viewed from each of the irradiation light projection units 4, whereby the outline of the coating light is further corrected in response to the positional relationship between the origin position of the irradiation target object and each of the irradiation light projection units 4. In the case where two irradiation light projection units 4 exist like the irradiation light projection units 4A and 4B, the correction processing for the irradiation light signal is performed twice in total for each of the irradiation light projection units 4.

In Step S7 that follows, the plural pieces of irradiation light to be projected from the irradiation light projection units 4 are generated by the irradiation light generation unit 3 in accordance with the irradiation light signal for the irradiation light projection units 4, which is corrected in Step S6.

In Step S8 that follows, one piece of the irradiation light is outputted to the irradiation light projection unit 4A by the irradiation light generation unit 3.

In Step S9 that follows, it is determined whether or not there exists no other irradiation light projection unit 4 other than the irradiation light projection unit that has outputted the irradiation light in Step S6 to Step S8. In the case where another irradiation light projection unit 4 exists, then in Step S10, the irradiation light is outputted to the other irradiation light projection unit 4 concerned. In the case where no other irradiation light projection unit 4 exists, the irradiation light is projected toward the irradiation target object by the plurality of irradiation light projection units 4.

In accordance with the lighting apparatus that performs the operations as described above, in Step S6, the outline of the coating light included in the irradiation light is cut in accordance with the outline of the irradiation target object viewed from the irradiation light projection unit 4A, and the outline of the coating light is further corrected in response to the positional relationship between the origin position of the irradiation target object and the irradiation light projection unit 4A. In a similar way, the outline of the coating light included in the irradiation light is cut in accordance with the outline of the irradiation target object viewed from the irradiation light projection unit 4B, and the outline of the coating light can be further corrected in response to the positional relationship between the origin position of the irradiation target object and the irradiation light projection unit 4B.

Figure 12:
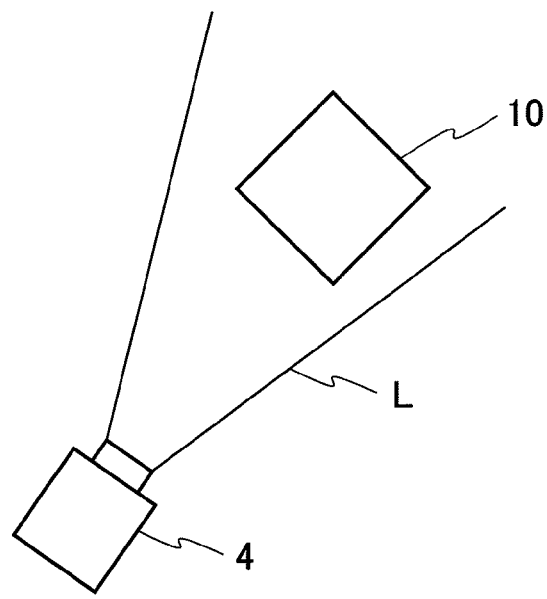
FIG. 12 is a top view showing a state where irradiation light is projected, without being corrected, by the lighting apparatus to which the present invention is applied.
Figure 13:
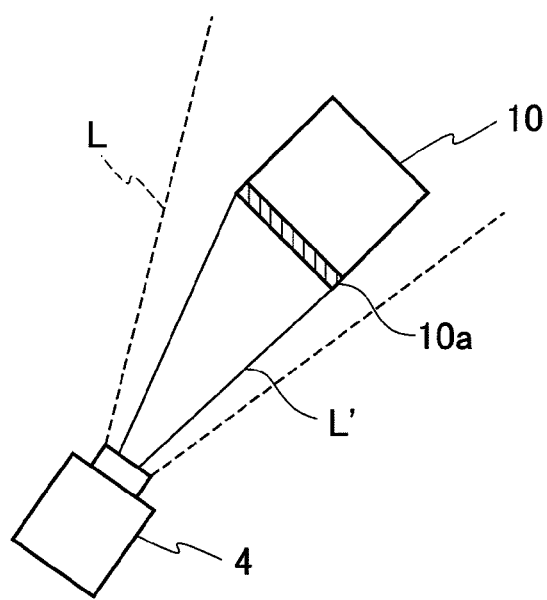
FIG. 13 is a top view showing a state where the irradiation light is projected, after being corrected, by the lighting apparatus to which the present invention is applied.

In the case where the irradiation light is projected from the irradiation light projection unit 4 without being corrected by the first irradiation light signal correction unit 2, then as shown in FIG. 12, the irradiation light becomes irradiation light L that also spreads to a region other than the irradiation target object 10. However, by performing the operations as described above, the lighting apparatus can form the irradiation light into irradiation light L' in which a range is regulated only to a coating region 10*a* within an outline of the irradiation target object 10, which is viewed from the irradiation light projection unit 4A, as shown in FIG. 13. Note that, in the following description, in the case of describing the range on the irradiation target object 10, such as the coating region 10*a*, and a range on an object to be described later, which is located behind the irradiation target object 10, these ranges are shown as layers in order to clarify a positional relationship therebetween; however, in actual, these ranges are directly on the irradiation target object 10 and on the object behind the same.

Figure 14:
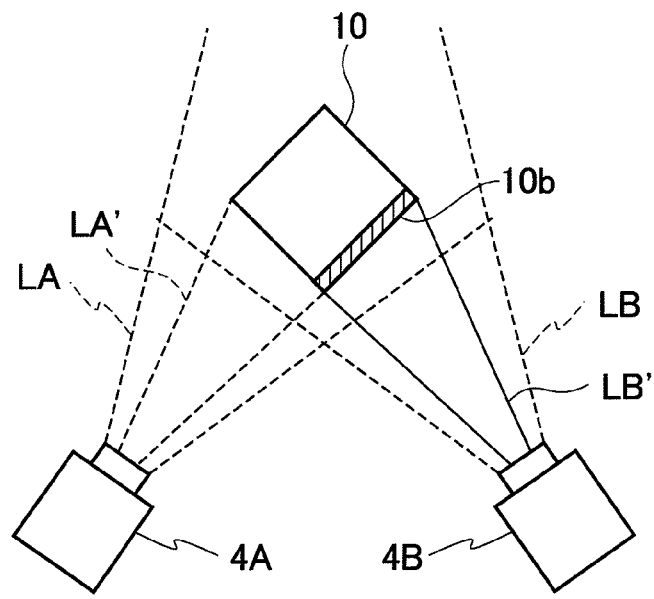
FIG. 14 is a top view showing a state where corrected irradiation light is projected from another irradiation light projection unit by the lighting apparatus to which the present invention is applied.

Moreover, in accordance with this lighting apparatus, in the case where the irradiation light projection unit 4B is arranged to be directed toward the irradiation target object 10 as shown in FIG. 14, corrected irradiation light LB' can be irradiated from the irradiation light projection unit 4B onto the irradiation target object 10. In other words, in a similar way to the irradiation light projection unit 4A, the irradiation light can be formed into the irradiation light LB' in which a range is regulated only to a coating region 10*b* within an outline viewed from the irradiation light projection unit 4B.

Figure 15:
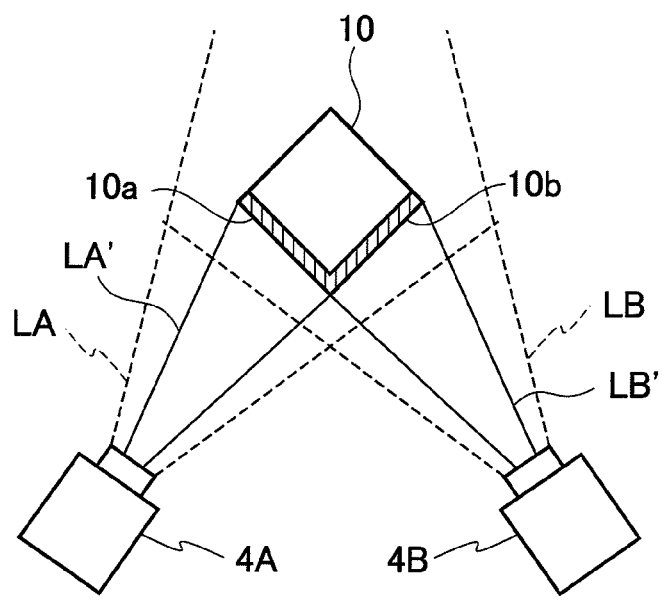
FIG. 15 is a top view showing a state where corrected irradiation light is projected from the plurality of irradiation light projection units by the lighting apparatus to which the present invention is applied.

In accordance with the lighting apparatus as described above, the irradiation light projection unit 4A and the irradiation light projection unit 4B are driven simultaneously. In such a way, as shown in FIG. 15, the lighting apparatus can project such corrected irradiation light LA' only onto the coating region 10*a* of the irradiation target object 10, and can project the corrected irradiation light LB' only onto the coating region 10*b* of the irradiation target object 10.

Figure 16:
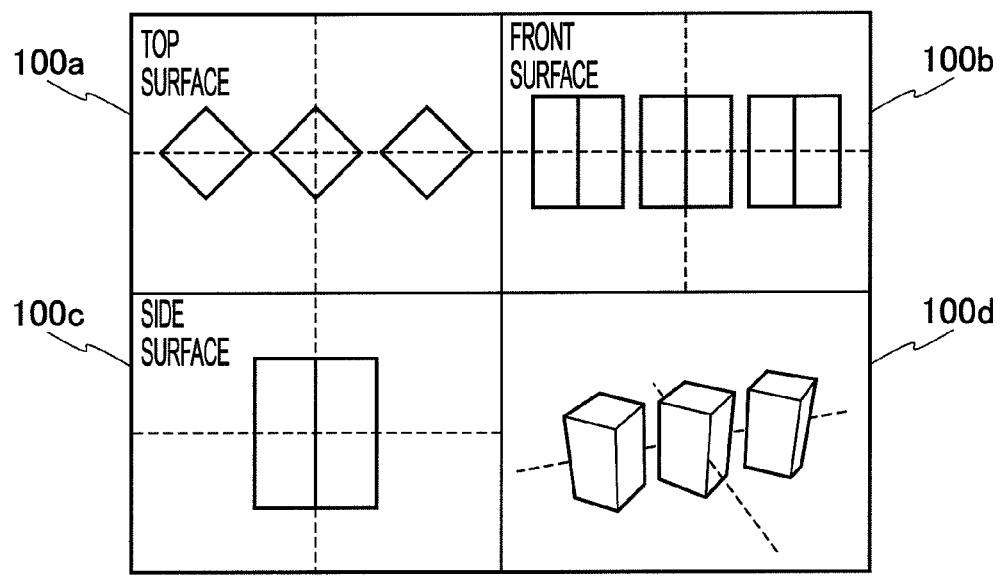
FIG. 16 is a view showing shape data of another irradiation target object.

Moreover, for example as showing shape data in FIG. 16, even in the case where a plurality of the irradiation target objects 10 exist for the irradiation light projection units 4A and 4B, the lighting apparatus corrects the coating light only for outlines of the plurality of irradiation target objects 10 viewed from the respective irradiation light projection units 4. In such a way, the lighting apparatus can project the irradiation light so as to coat the respective irradiation target objects 10.

As described above, in accordance with the lighting apparatus to which the present invention is applied, the parameters of the irradiation target object 10 are received as the three-dimensional shape, and accordingly, shapes observed in many directions (from a front surface, a side surface, a back surface, a top surface and the like) in the three-dimensional coordinates can be recognized for each of the irradiation light projection units 4. In such a way, in accordance with the lighting apparatus, even in the case where a large number of the irradiation light projection units 4 are arranged for the irradiation target object 10, the irradiation light can be corrected so as to coat the irradiation target object 10 with high accuracy.

Moreover, in accordance with this lighting apparatus, the irradiation target object 10 can be coated by the plurality of irradiation light projection units 4, and accordingly, the irradiation target object 10 can be coated over a wide region that cannot be covered by a projection region of one irradiation light projection unit 4. To be more specific, the irradiation target object 10 can be coated three-dimensionally such that the plural pieces of irradiation light are simultaneously projected onto the front side and back side of the irradiation target object 10.

Furthermore, onto a shadow portion that occurs by irradiation light projected onto the irradiation target 10 from a certain irradiation light projection unit 4, irradiation light of another irradiation light projection unit 4 can be projected, and a lighting environment where no shadow of the irradiation target object 10 exists can be realized.

Next, a description will be made of another configuration, to which the present invention is applied, with reference to FIG. 17 to FIG. 19.

Figure 17:
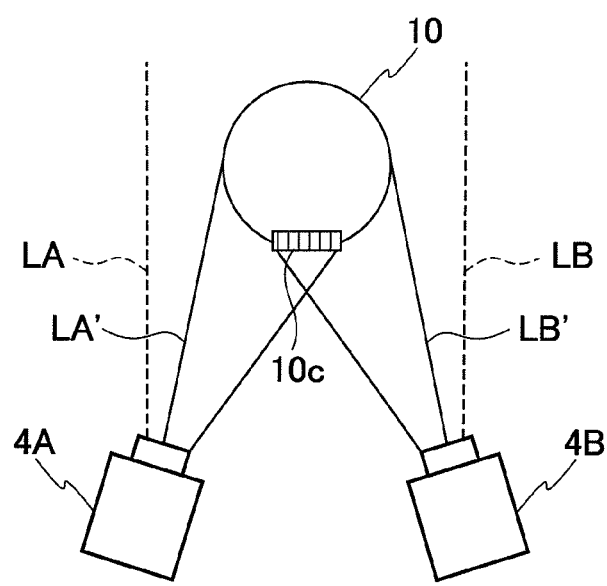
FIG. 17 is a top view showing a state where a superimposition region is formed by the plurality of irradiation light projection units in the lighting apparatus to which the present invention is applied.

As shown in FIG. 17, like dividing the surface of the irradiation target object 10, a lighting apparatus in this configuration sets the projection region for each of the irradiation light projection units 4A and 4B. In this case, the plurality of irradiation light projection units 4A and 4B are arranged so that, at the time of being irradiated onto the respective divided regions by the respective irradiation light projection units 4a and 4B, the plural pieces of irradiation light projected by the different irradiation light projection units 4A and 4B can be superimposed on each other.

This lighting apparatus divides the entire projection region into the projection region within the outline of the irradiation target object 10 viewed from the irradiation light projection unit 4A and the projection region within the outline of the irradiation target object 10 viewed from the irradiation light projection unit 4B. In such a way, the lighting apparatus projects corrected irradiation light LA' and corrected irradiation light LB' from the irradiation light projection units 4A and 4B, respectively. At this time, on the irradiation target object 10, there occurs a superimposition region 10c of a region onto which the corrected irradiation light LA' is projected and a region onto which the corrected irradiation light LB' is projected. In order to provide this superimposition region 10c, the arrangement of the irradiation light projection units 4A and 4B is decided by the following arithmetic operations.

Figure 18:
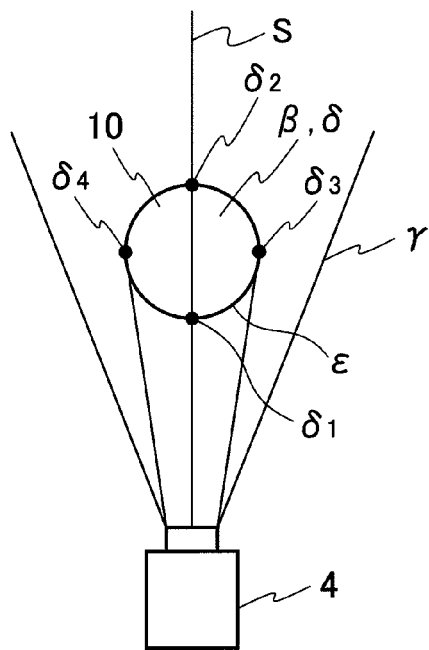
FIG. 18 is a top view explaining coordinate arithmetic operations in the lighting apparatus to which the present invention is applied.

First, as shown in FIG. 18, a space in which the irradiation target object 10 and two or more irradiation light projection units 4 are included is designated by three-dimensional coordinates: $\alpha[X, Y, Z]$ (world coordinates) (not shown). Note that X, Y and Z are coordinates of the respective axes in the three-dimensional direction, and in FIG. 18, a state is shown, where the irradiation target object 10 and the irradiation light projection unit 4 are viewed from above.

Next, the three-dimensional shape data of the irradiation target object 10 as shown in FIG. 3 or FIG. 16 is created, and the surface region of the irradiation target object 10 is expressed by three-dimensional coordinates: $\beta o\ [x(a), y(a), z(a)]$. The three-dimensional coordinates: $[\beta o(a), y(a), z(a)]$ are subjected to coordinate transformation so as to correspond to positions and postures of the irradiation target object 10 and the irradiation light projection unit 4 in the three-dimensional coordinate space $\alpha$. In such a way, shape coordinates: $\beta[x(a), y(a), z(a)]$ of the surface of the irradiation target object 10 in the three-dimensional coordinate space $\alpha$ are calculated.

Next, the projection region of the irradiation light projection unit 4 is set, and a position and posture of a center (optical center) of the irradiation light projection unit 4 are specified. In such a way, coordinates $\gamma[x(b), y(b), z(b)]$ of the projection region in the three-dimensional coordinates a are calculated. The coordinates $\gamma[x(b), y(b), z(b)]$ of the projection region of the irradiation light projection unit 4 are set by a projection surface shape (for example, a rectangle having an aspect ratio of 4:3) and by values of the projection angles of view in the horizontal/vertical directions.

Next, a coordinate region: $\delta[x(c), y(c), z(c)]$ where the shape coordinates: $\beta[x(a), y(a), z(a)]$ of the surface of the irradiation target object 10 and the coordinates $\gamma[x(b), y(b), z(b)]$ of the projection region coincide with each other is extracted. This coordinate region: $\delta$ specifies a region of the surface of the irradiation target object 10, which is included in the projection region of the irradiation light projection unit 4. Note that, in FIG. 18, a state is shown, where all of the shape coordinates: $\beta[x(a), y(a), z(a)]$ of the surface of the irradiation target object 10 are included in the coordinates $\gamma[x(b), y(b), z(b)]$ of the projection region. However, both of a coordinate $\delta 1$ on the front side of the irradiation target object 10, which is projectable by the irradiation light projection unit 4, and a coordinate $\delta 2$ on a back side of the irradiation target object 10, which is not projectable thereby, are included in the coordinate region: $\delta[x(c), y(c), z(c)]$ where both of the shape coordinates: $\beta[x(a), y(a), z(a)]$ of the surface of the irradiation target object 10 and the coordinates $\gamma[x(b), y(b), z(b)]$ of the projection region coincide with each other. Therefore, it is necessary to remove the coordinate $\delta 2$ on the back side of the irradiation target object 10 when viewed from the irradiation light projection unit 4 from the coordinate region: $\delta$ where both of the above-described coordinates coincide with each other.

In this connection, a large number of linear expressions S including the center (optical center) of the irradiation light projection unit and the coordinate region: $\delta[x(c), y(c), z(c)]$ are calculated. In the case where a plurality of the coordinates $\delta$ are detected on each of the linear expressions S, only the coordinate S that is the closest to the irradiation light projection unit 4 is left remained among the coordinates $\delta$ detected on the linear expression S concerned, and the other coordinates $\delta$ are removed. To be more specific, in the case where the coordinates 51 and 52 are detected on the linear expression S shown in FIG. 18, only the coordinate $\delta 1$ closer to the position of the irradiation light projection unit 4 is left remained, and the coordinate $\delta 2$ is deleted. In such a way, as the region onto which the irradiation light from the irradiation light projection unit 4 is to be projected, there can be extracted only a coordinate region: $\epsilon[x(d), y(d), z(d)]$ on the front side of the irradiation target object 10, which ranges from the coordinate $\delta 3$ through the coordinate $\delta 1$ to the coordinate $\delta 4$, on the surface of the irradiation target object 10.

The coordinate arithmetic operation as described above is performed for two irradiation light projection units 4A and 4B. In such a way, the lighting apparatus can obtain a coordinate region $\epsilon 1\ [x1(e), y1(e), z1(e)]$ projectable on the irradiation target object 10 by the irradiation light projection unit 4A, and a coordinate region $\epsilon 2\ [x2(f), y2(f), z2(f)]$ projectable on the irradiation target object 10 by the irradiation light projection unit 4B.

Next, the divided regions are set on the irradiation target object 10 so as to provide the superposition region 10c in which the coordinate region $\epsilon 1$ of the irradiation light projection unit 4A and the coordinate region a of the irradiation light projection unit 4B are superimposed on each other. The irradiation light projection units 4A and 4B are arranged for each of the divided regions. In such a way, such an arrangement environment of the irradiation light projection units 4A and 4B that forms the superimposition region 10c on the irradiation target object 10 can be constructed.

In the case where the irradiation light projection units 4A and 4B are arranged as described above, the superimposition region 10c on the irradiation target object 10 is specified as a coordinate region: $\zeta[x1(g), y1(g), z1(g)]$ in which the coordinate region $\epsilon 1$ and the coordinate region $\epsilon 2$ are superimposed on each other. Note that, in the case where three irradiation light projection units 4 exist, then the above-described arithmetic operation is performed so that the plural pieces of irradiation light L for the three irradiation light projection units 4 can be superimposed on one another, whereby the three irradiation light projection units 4 can be arranged so as to form the superimposition region 10*c*.

In accordance with the lighting apparatus as described above, the plurality of irradiation light projection units 4 are arranged so as to allow the superimposition region 10*c* to exist on the irradiation target object 10. In such a way, no gap is formed among the plural pieces of coating light projected by the respective irradiation light projection units 4, and the irradiation target object 10 can be continuously coated with the plural pieces of irradiation light L.

Next, a description will be made of another configuration, to which the present invention is applied, with reference to FIG. 19 to FIG. 24. Note that the same reference numerals are assigned to similar configurations to those of the above-mentioned lighting apparatuses, whereby a detailed description thereof will be omitted.

Figure 19:
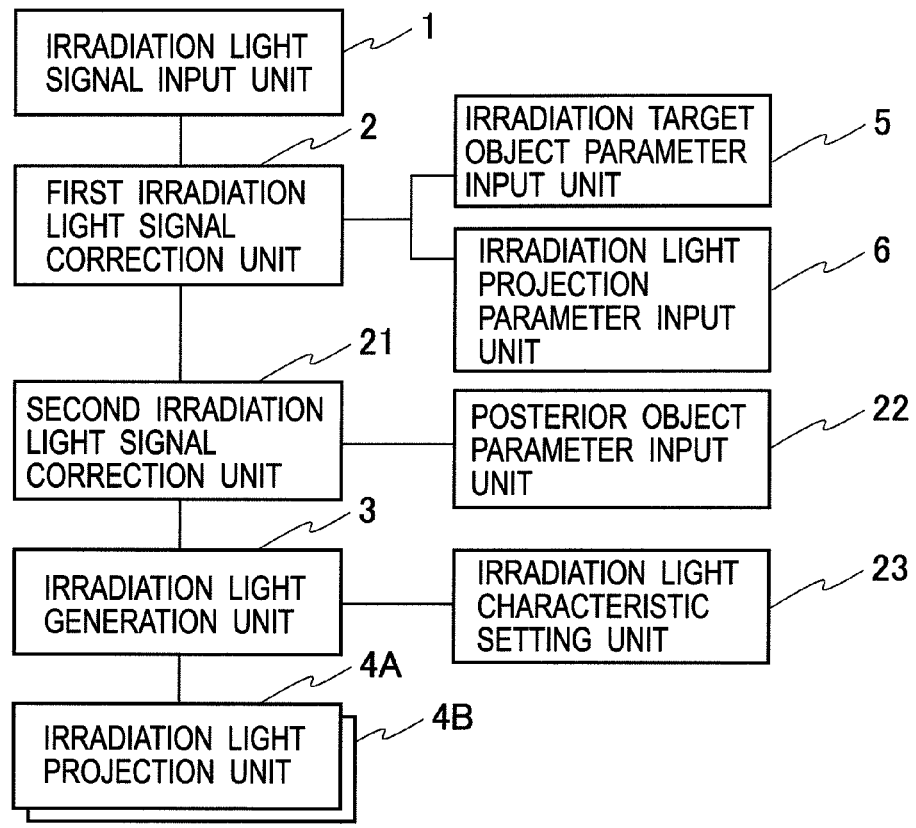
FIG. 19 is a block diagram showing a functional configuration of another lighting apparatus to which the present invention is applied.
Figure 20:
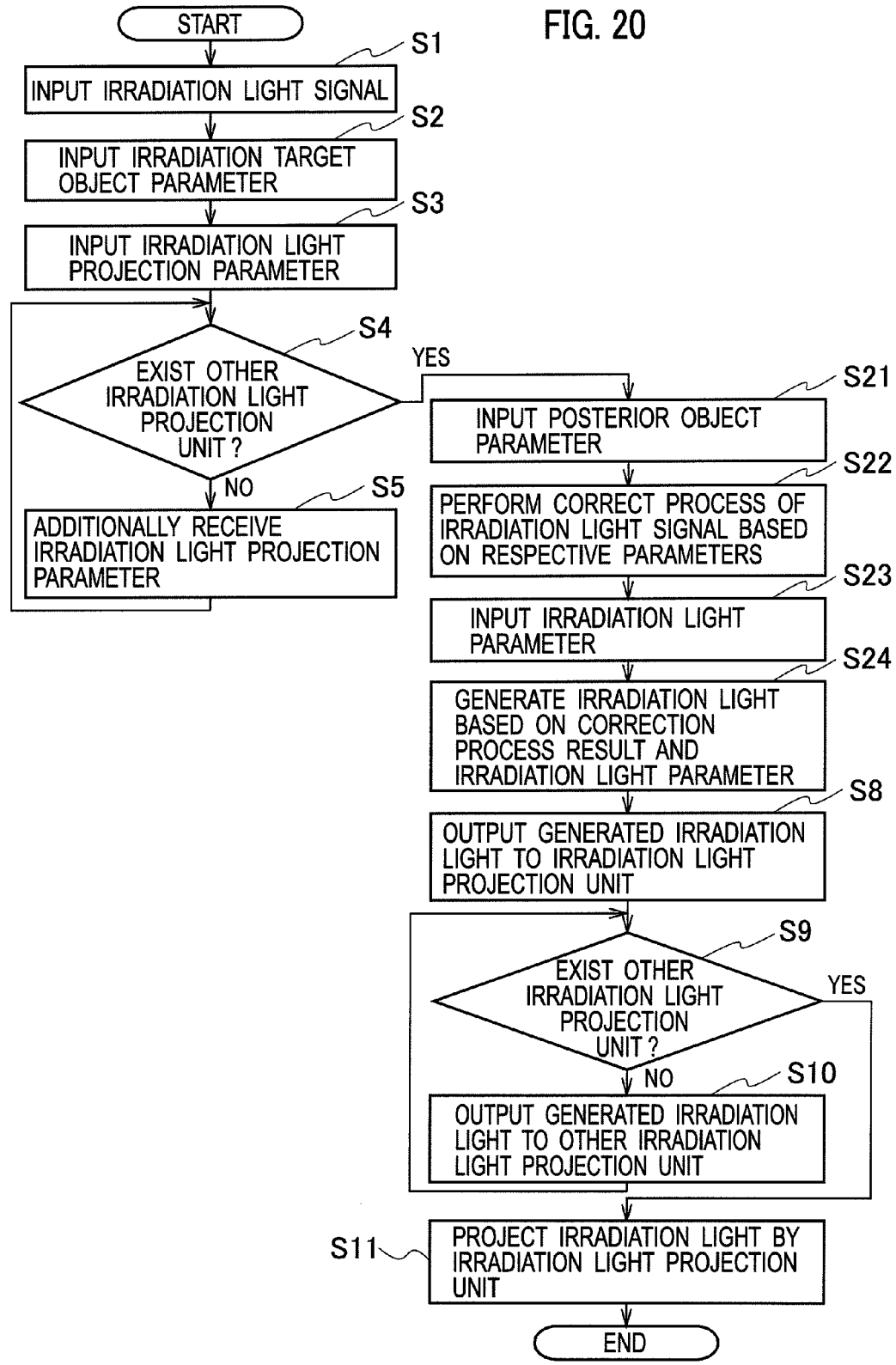
FIG. 20 is a flowchart showing an operation procedure of the another lighting apparatus to which the present invention is applied.

As shown in FIG. 19, a lighting apparatus in this configuration is different from the above-mentioned lighting apparatus shown in FIG. 1 in including: a second irradiation light signal correction unit 21 that performs correction processing for projecting the irradiation light L onto the object behind the irradiation target object; a posterior object parameter input unit 22 that receives such a posterior object parameter; and an irradiation light characteristic setting unit 23 that changes characteristics of the irradiation light generated by the irradiation light generation unit 3. By the second irradiation light signal correction unit 21, this lighting apparatus corrects the irradiation light signals so as to divide the irradiation light irradiated by each of the irradiation light projection units 4 into the coating light that coats the irradiation target object 10 and the background light that becomes the background of the irradiation target object 10. The lighting apparatus corrects the irradiation light signals based on the posterior object parameter including a three-dimensional shape, position and posture of the posterior object having an arbitrary shape, which exists behind the irradiation target object 10.

Then, by the irradiation light characteristic setting unit 23, the lighting apparatus sets irradiation light characteristics for each of the irradiation light signal that indicates the coating light and is corrected by the second irradiation light signal correction unit 21 and the irradiation light signal that indicates the background light and is corrected thereby. Then, the lighting apparatus generates irradiation light including the coating light and the background light by the irradiation light generation unit 3.

Figure 21:
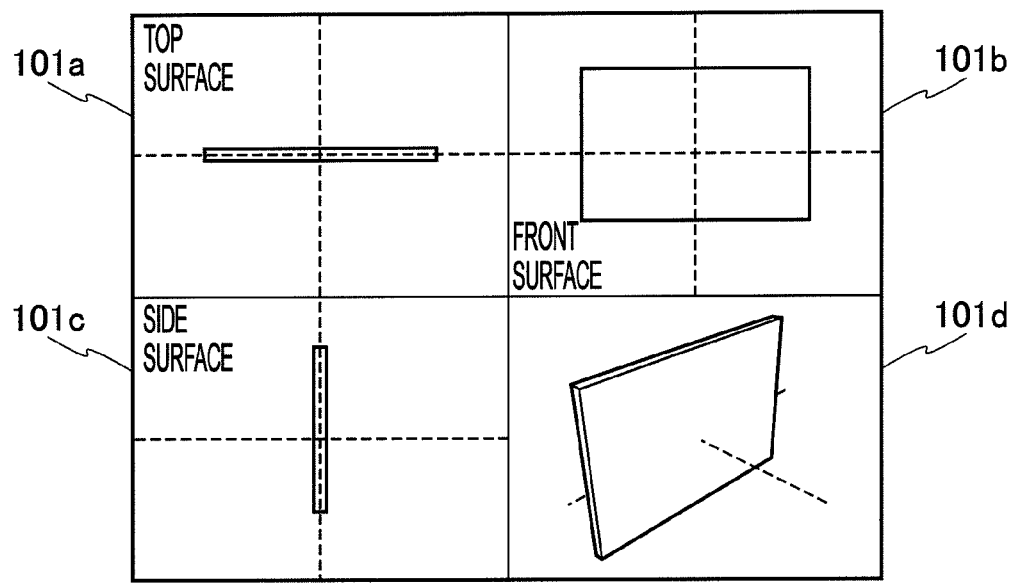
FIG. 21 is a view showing shape data of a posterior object.
Figure 22:
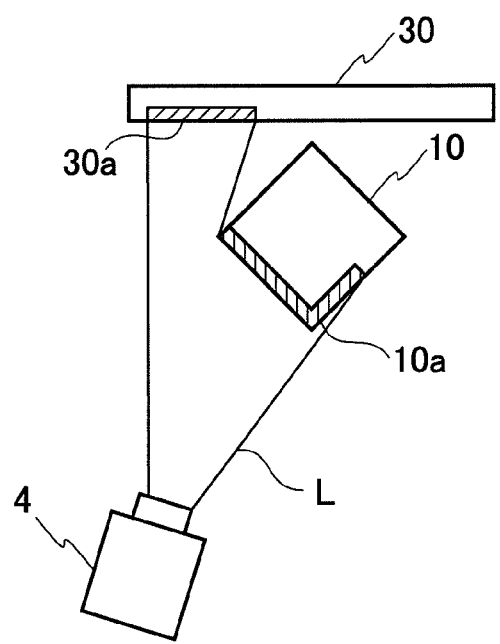
FIG. 22 is a top view showing a state where the irradiation light is projected onto the irradiation target object and the posterior object by the single irradiation light projection unit in the another lighting apparatus to which the present invention is applied.

With regard to operations of the lighting apparatus as described above, as shown in FIG. 20, after it is determined in Step S4 that the irradiation light projection parameters are received for all of the irradiation light projection units 4, Step S21 is performed. In Step S21, the posterior object parameter is received by the second irradiation light signal correction unit 21 from the posterior object parameter input unit 22. In addition to the position and posture of such a background object, as shown in FIG. 21, this background object parameter includes top surface shape data 100 indicating a top surface shape of the plate-like background object, front surface shape data 100*b* indicating a front surface shape thereof, a side surface shape data 100*c* indicating a side surface shape thereof, and arbitrary angle shape data 100*d* indicating a shape thereof viewed at an arbitrary angle.

Next, in Step S22, by the first irradiation light signal correction unit 2, the irradiation light signal is corrected based on the irradiation light projection parameter and the irradiation target object parameter for each irradiation light projection unit 4. In such a way, the outline of the coating light included in the irradiation light is cut in accordance with the outline of the irradiation target object viewed from the irradiation light projection unit 4, and the outline of the coating light is further corrected in response to the positional relationship between the origin position of the irradiation target object 10 and the irradiation light projection unit 4. Moreover, in Step S22, the irradiation light signal corrected by the first irradiation light signal correction unit 2 is divided into the coating light and the background light based on the irradiation light projection parameter and the posterior object parameter. Then, the irradiation light signal for projecting the coating light within the outline of the irradiation target object 10 and the irradiation light signal for projecting the background light outside of the outline of the irradiation target object 10 are supplied to the irradiation light generation unit 3.

In Step S23 that follows, an irradiation light parameter indicating the irradiation light characteristics set in the irradiation light characteristic setting unit 23 is received by the irradiation light generation unit 3. This irradiation light parameter indicates the color and brightness of the coating light and the color and brightness of the background light.

In Step S24 that follows, by the irradiation light generation unit 3, the irradiation light parameter received in Step S23 is referred to, and the irradiation light characteristics such as the color and the brightness are set for the irradiation light signal of the coating light and the irradiation light signal of the background light, which are subjected to the correction processing in Step S22. In such a way, the irradiation light generation unit 3 generates the irradiation light including the coating light and the background light.

Then, in the case where two irradiation light projection units 4 exist like the irradiation light projection units 4A and 4B, the lighting apparatus performs the correction processing (Steps S21, S22) for the irradiation light signal and the setting processing (Steps S23, S24) for the irradiation light characteristics twice in total for each of the irradiation light projection units 4. The correction processing for the irradiation light signals and the irradiation light characteristic processing are performed for all of the irradiation light projection units 4, whereby each of the irradiation light projection units 4 can project the irradiation light, which is generated by the irradiation light generation unit 3, onto the irradiation target object 10 and the background object.

Figure 23:
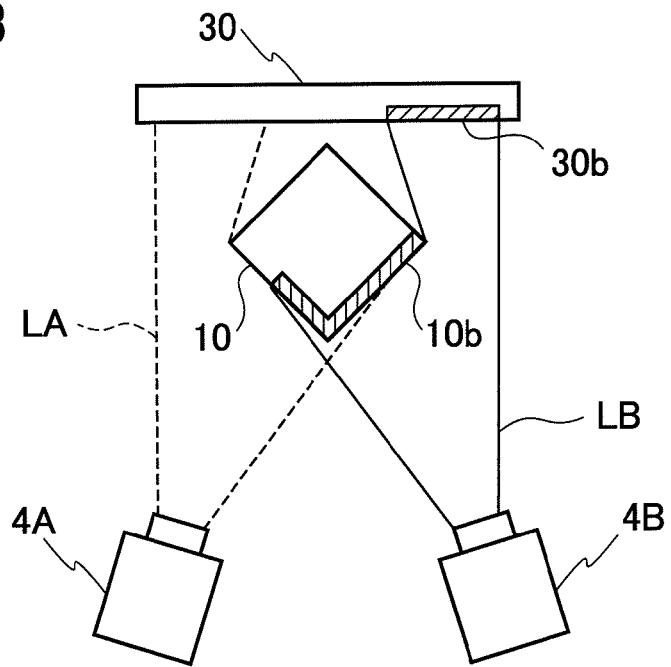
FIG. 23 is a top view showing a state where the irradiation light is projected onto the irradiation target object and the posterior object by the another irradiation light projection unit in the another lighting apparatus to which the present invention is applied.

By such operations as described above, as shown in FIG. 22, the lighting apparatus can set different irradiation light characteristics for the characteristics of the coating light to be projected onto the coating region 10*a* of the irradiation target object 10 and the characteristics of the background light to be projected onto a background light projection region 30*a* of the posterior object 30, and can project the irradiation light L from the irradiation light projection unit 4. Moreover, as shown in FIG. 23, by the irradiation light projection unit 4B as one of the two irradiation light projection units 4A and 4B, the lighting apparatus can project irradiation light LB including the coating light and the background light, for which different irradiation light characteristics are set, onto the coating region 10*b* of the irradiation target object 10 and a background light projection region 30*b* of the posterior object 30.

Figure 24:
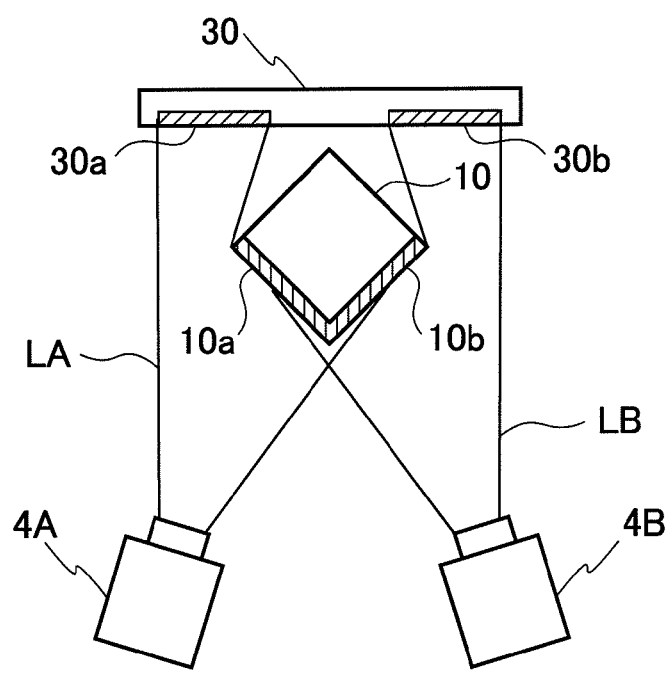
FIG. 24 is a top view showing a state where the irradiation light is projected onto the irradiation target object and the posterior object by the plurality of irradiation light projection units in the another lighting apparatus to which the present invention is applied.

Then, the lighting apparatus projects the irradiation light LA and the irradiation light LB simultaneously by the two irradiation light projection units 4A and 4B. In such a way, as shown in FIG. 24, the coating region 10*a* and the coating region 10*b* can be coated with the coating light, and the background light can be projected onto the background light projection region 30*a* and the background light projection region 30*b*.

As described above, in accordance with the lighting apparatus, the coating light projected from the irradiation light projection unit 4 is projected onto the irradiation target object 10, and the background light projected from the irradiation light projection unit 4 is projected onto the posterior object 30. In such a way, the irradiation light can be utilized effectively. Moreover, the different irradiation light characteristics (color and brightness) are set individually for the coating light projected onto the irradiation target object 10 and the posterior light projected onto the posterior object 30. In such a way, individually for the irradiation target object 10 and the posterior object 30, it is not necessary to provide projectors like a projector for the irradiation target object 10 and a projector for the posterior object. Hence, the number of irradiation light projection units 4 can be reduced.

Figure 25:
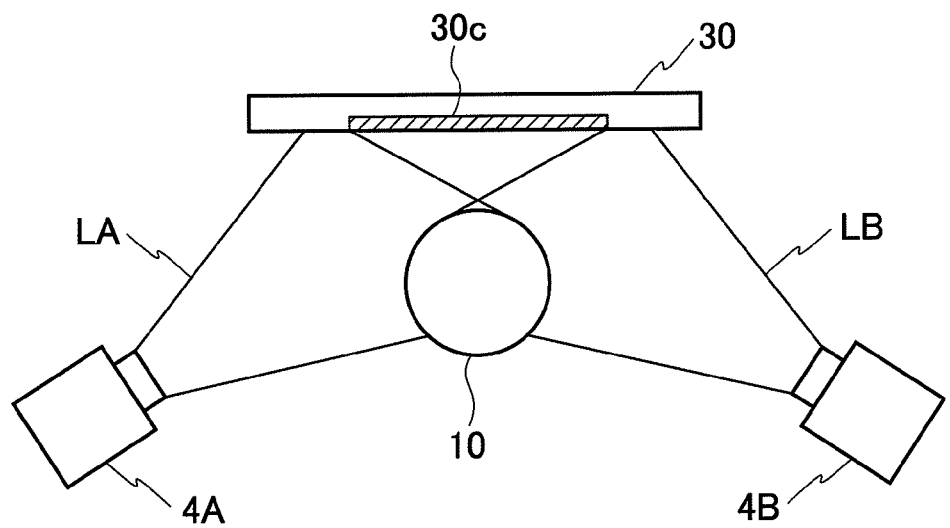
FIG. 25 is a top view explaining that the plurality of irradiation light projection units are arranged so as to provide a superimposition region on the posterior object in the another lighting apparatus to which the present invention is applied.

Moreover, as shown in FIG. 25, the lighting apparatus may arrange the irradiation light projection units 4A and 4B so as to provide, on the posterior object 30, a superimposition region 30c in which the irradiation light LA projected from the irradiation light projection unit 4A and the irradiation light LB projected from the irradiation light projection unit 4B are superimposed on each other. Such a lighting apparatus sets projection regions, which is obtained by dividing a surface of the posterior object 30, for each of the irradiation light projection units 4A and 4B. The plurality of irradiation light projection units 4A and 4B are arranged so that, when the respective divided regions are irradiated by the respective irradiation light projection units 4A and 4B, the plural pieces of irradiation light, which are projected by the different irradiation light projection units 4A and 4B, can be superimposed on each other in a region including a boundary between the adjacent divided regions.

Arrangement positions of the irradiation light projection units 4A and 4B, which are arranged in order to provide the superimposition region 30c as described above, are obtained by performing similar arithmetic operations to the arithmetic operations described with reference to FIG. 18. To be more specific, in the three-dimensional coordinates: α[X, Y, Z] (world coordinates) of the space, shape coordinates: β'[x(a), y(a), z(a)] of the surface of the posterior object 30 and the coordinates γ[x(b), y(b), z(b)] of the projection regions of the irradiation light projection units 4A and 4B are temporarily set, and a coordinate region: δ'[x(c), y(c), z(c)] where both of the shape coordinates: β'[x(a), y(a), z(a)] and the coordinates y[x(b), y(b), z(b)] coincide with each other is extracted. In such a way, coordinate regions: ε'[x(d), y(d), z(d)] on the front side of the posterior object 30 viewed from the irradiation light projection units 4A and 4B are obtained. Then, among the coordinate regions: ε'[x(d), y(d), z(d)] on the front side of the posterior object 30, in the case where the shape coordinate: β[x(a), y(a), z(a)] of the surface of the irradiation target object 10 exists on a straight line connecting each of the irradiation light projection units 4A and 4B and the posterior object 30 to each other, the coordinate region: ε'[x(d), y(d), z(d)] on the front side of the posterior object 30 on the straight line concerned is deleted.

By the coordinate arithmetic operations as described above, the lighting apparatus obtains a coordinate: ζ'[x1(g), y1(g), z1(g)] of the superimposition region 30c in which the background light projection region 30a to be projected onto the posterior object 30 by the irradiation light projection unit 4A and the background light projection region 30b to be projected onto the posterior object 30 by the irradiation light projection unit 4B are superimposed on each other. The arrangement of the irradiation light projection units 4A and 4B is decided so as to provide the superimposition region 30c.

In accordance with the lighting apparatus as described above, the plurality of irradiation light projection units 4 are arranged so that the superimposition region 30c can exist on the posterior object 30. In such a way, no gap is formed among the plural pieces of background light projected by the respective irradiation light projection units 4, and the posterior object 30 can be continuously projected by the plural pieces of irradiation light L.

Figure 26:
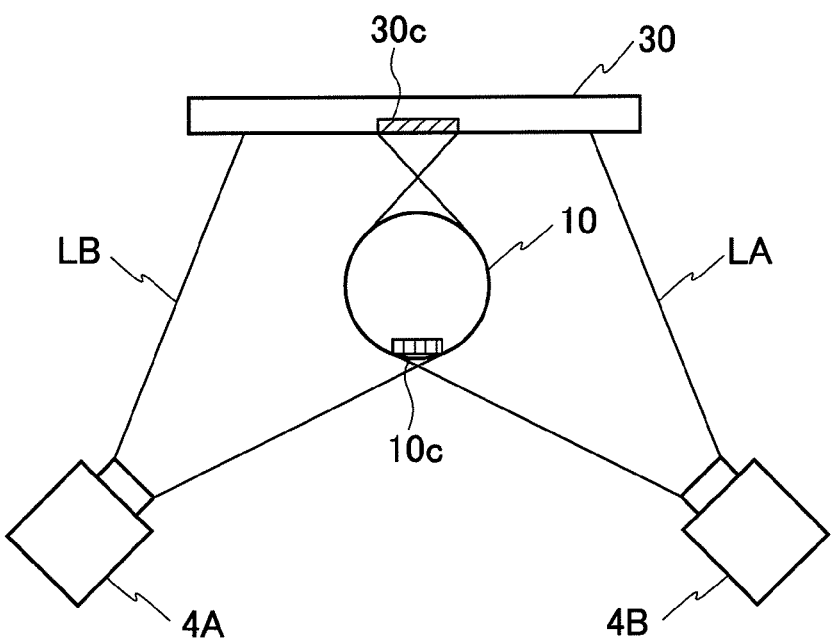
FIG. 26 is a top view explaining that the plurality of irradiation light projection units are arranged so as to provide posterior objects on irradiation target object and the posterior object in the another lighting apparatus to which the present invention is applied.

Furthermore, as shown in FIG. 26, the lighting apparatus may arrange the irradiation light projection units 4A and 4B so that the superimposition region 10c can be formed of the plural pieces of coating light, which are projected from the individual irradiation light projection units 4A and 4B, and that the superimposition region 30c can be formed of the plural pieces of background light, which are projected from the individual irradiation light projection units 4A and 4B. In this case, by performing the coordinate arithmetic operations as mentioned above, the arrangement of the irradiation light projection units 4A and 4B can be decided so that both of the superimposition region 10c and the superimposition region 30c can be formed.

In accordance with the lighting apparatus as described above, the plurality of irradiation light projection units 4 are arranged so that the superimposition regions 10c and 30c can exist for both of the irradiation target object 10 and the posterior object 30. In such a way, no gap is formed among the plural pieces of light projected by the respective irradiation light projection units 4, and the irradiation target object 10 and the posterior object 30 can be continuously projected by the plural pieces of irradiation light L.

Figure 27:
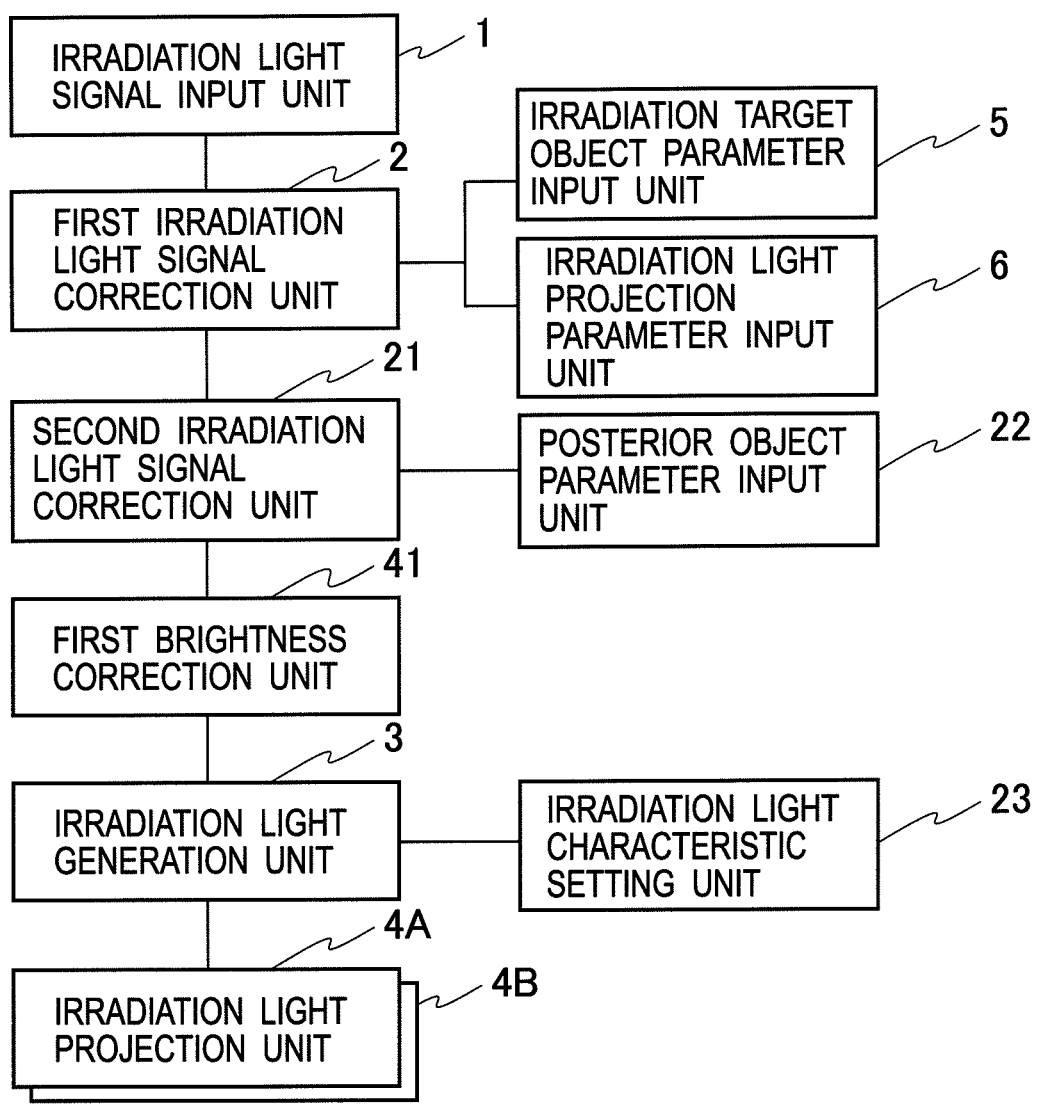
FIG. 27 is a block diagram showing a functional configuration of another lighting apparatus to which the present invention is applied.
Figure 28:
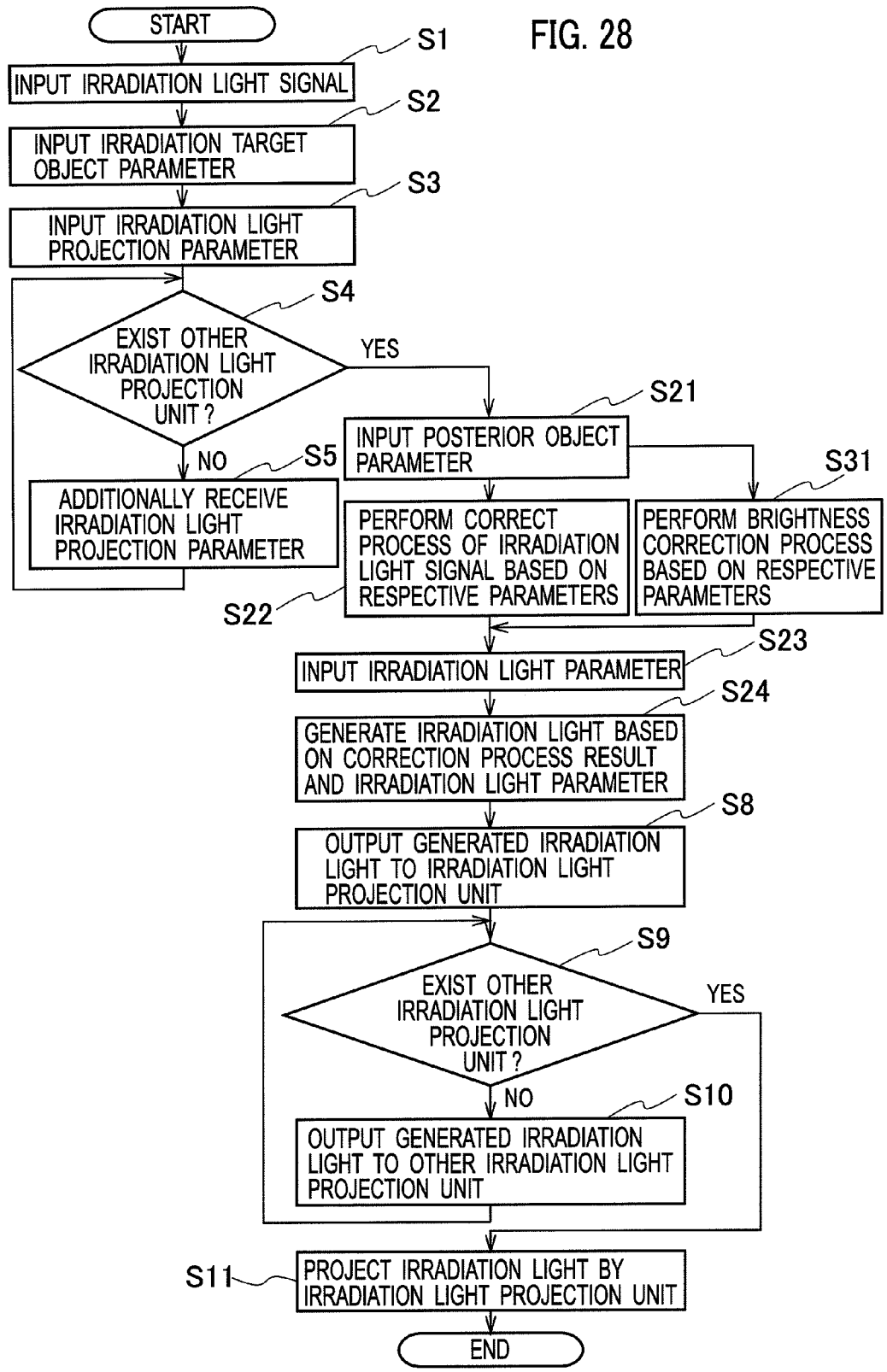
FIG. 28 is a flowchart showing an operation procedure of the another lighting apparatus to which the present invention is applied.
Figure 29:
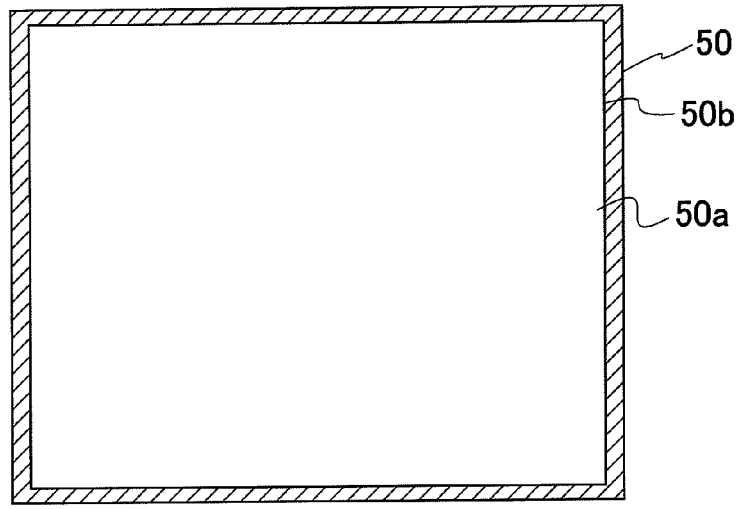
FIG. 29 is a view explaining a brightness table of correcting brightness in the another lighting apparatus to which the present invention is applied.

Next, a description will be made of another configuration, to which the present invention is applied, with reference to FIG. 27 to FIG. 29. Note that the same reference numerals are assigned to similar configurations to those of the above-mentioned lighting apparatuses, whereby a detailed description thereof will be omitted.

A lighting apparatus in this configuration is different from those of the above-mentioned embodiment in including a first brightness correction unit 41 that corrects the brightness of the irradiation light signal corrected by the second irradiation light signal correction unit 21. This first brightness correction unit 41 calculates the superimposition region 10c in which the plural pieces of coating light irradiated from the different irradiation light projection units 4 are superimposed on each other, and the superimposition region 30c in which the plural pieces of posterior light irradiated therefrom are superimposed on each other (refer to FIG. 17, FIG. 25 and FIG. 26), and corrects the brightness of the irradiation light projected from the respective irradiation light projection units 4 so that the brightness can become even in the vicinity of a boundary between the superimposition regions 10c and 30c concerned.

The first brightness correction unit 41 stores coordinate regions: ζ, ζ'[x1(g), y1(g), z1(g)], which specify the superimposition regions 10c and 30c, in advance. In the case of actually projecting the irradiation light onto the irradiation target object 1 and the posterior object 30 from the plurality of irradiation light projection units 4, the first brightness correction unit 41 performs brightness adjustment for portions of the irradiation light, which are portions included in the respective irradiation light signals of the irradiation light and corresponding to the superimposition regions 10c and 30c.

At this time, for example, the first brightness correction unit 41 specifies the irradiation light projection units 4 which are projecting the irradiation light onto the superimposition regions 10c and 30c, and calculates distances between each of the irradiation light projection units 4 and the superimposition regions 10c and 30c. As the distances between each of the irradiation light projection units 4 and the superimposition regions 10c and 30c are closer, it is defined that the brightness in the superimposition regions 10c and 30c is higher. Then, as an increasing rate of the brightness of the superimposition regions 10c and 30c onto which the plural pieces of irradiation light of the irradiation light projection units 4 are projected is higher with respect to brightness thereof when single irradiation light is projected from each of the irradiation light projection units 4, the brightness of each of the irradiation light projection units 4 is adjusted to so as be reduced in inverse proportion to the foregoing increasing rate of the brightness. At this time, the brightness of each of the irradiation light projection units 4 may be obtained by an arithmetic operation. Alternatively, as shown in FIG. 29, the irradiation light signal corresponding to each of the irradiation light projection units 4 may be changed so that brightness of a terminal end portion 50b can become lower than that of a center portion 50a in a brightness map 50 showing a brightness distribution in each of the superimposition regions 10c and 30c.

With regard to operations of the lighting apparatus as described above, as shown in FIG. 28, after Step S21, the correction processing for the irradiation light signal is performed by the first irradiation light signal correction unit 2 and the second irradiation light signal correction unit 21 in Step S22. At the same time, the brightness correction processing for the irradiation light signal is performed by the first brightness correction unit 41 based on the respective parameters. At this time, the first brightness correction unit 41 may calculate the superimposition regions 10c and 30c based on the irradiation target parameter, the irradiation light projection parameter and the background object parameter. Alternatively, the first brightness correction unit 41 may read out the superimposition regions 10c and 30c obtained from the preset positional relationship among the irradiation light projection units 4, the irradiation target object 10 and the posterior object 30. Then, the first brightness correction unit 41 corrects the brightness of the irradiation light signal so that the irradiation light signal can be inversely proportional to the increasing rate of the brightness of the superimposition regions 10c and 30c at the time when the plural pieces of irradiation light are projected by the plurality of irradiation light projection units 4 with respect to the brightness of the superimposition regions 10c and 30c at the time when the irradiation light is projected by the single irradiation light projection unit 4.

As described above, in accordance with the lighting apparatus, even in the case where the superimposition regions 10c and 30c are provided so that no gap among the plural pieces of coating light and among the plural pieces of background light can be formed on the irradiation target object 10 and the posterior object 30, the brightness correction can be performed so as to avoid a brightness increase in the superimposition regions 10c and 30c more than in the other portions. In such a way, unevenness in brightness on the irradiation target object 10 and the posterior object 30 is suppressed, and the brightness thereon can be made even.

Next, a description will be made of another configuration, to which the present invention is applied, with reference to FIG. 30 to FIG. 34. Note that the same reference numerals are assigned to similar configurations to those of the above-mentioned lighting apparatuses, whereby a detailed description thereof will be omitted.

Figure 30:
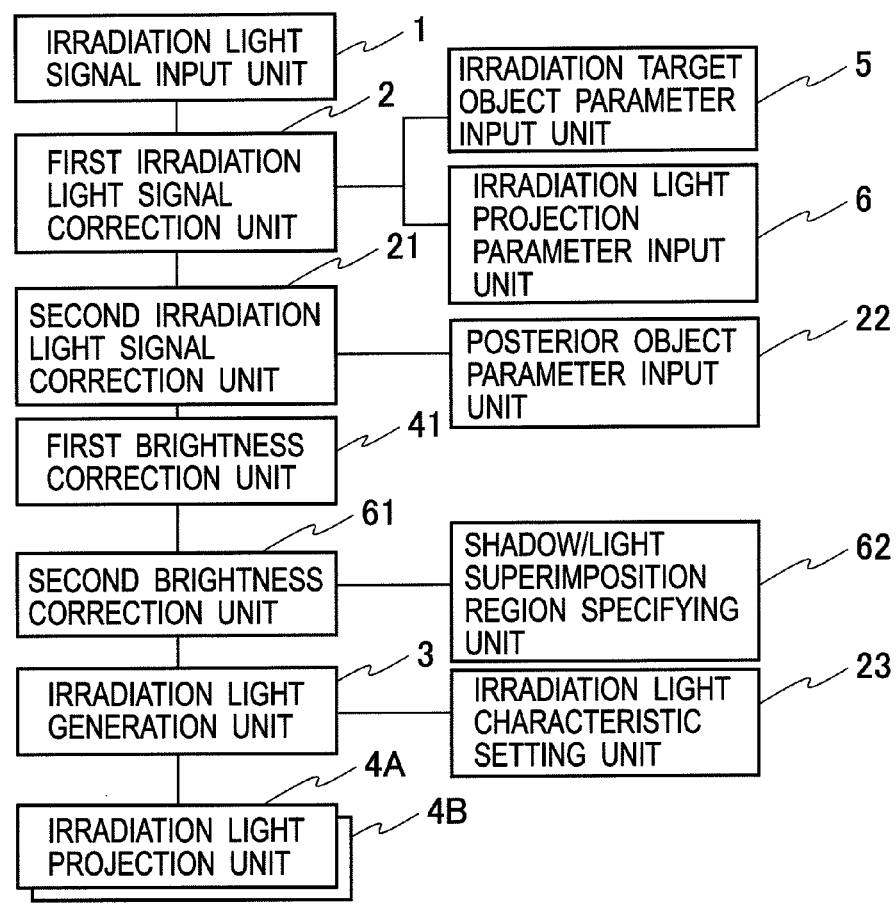
FIG. 30 is a block diagram showing a functional configuration of another lighting apparatus to which the present invention is applied.

As shown in FIG. 30, a lighting apparatus in this configuration is different from those of the above-mentioned lighting apparatus in including: a shadow/light superimposition region specifying unit 62; and a second brightness correction unit 21. The shadow/light superimposition region specifying unit 62 calculates a shadow region that occurs on the posterior object 30 in the case of projecting the irradiation light onto the irradiation target object 10 by the irradiation light projection unit 4, and calculates a shadow/light superimposition range as a shadow region of the calculated shadow region, which is superimposed on an irradiation range onto which the irradiation light is projected from another irradiation light projection units 4. The second brightness correction unit 61 corrects the brightness of the irradiation light.

Figure 31:
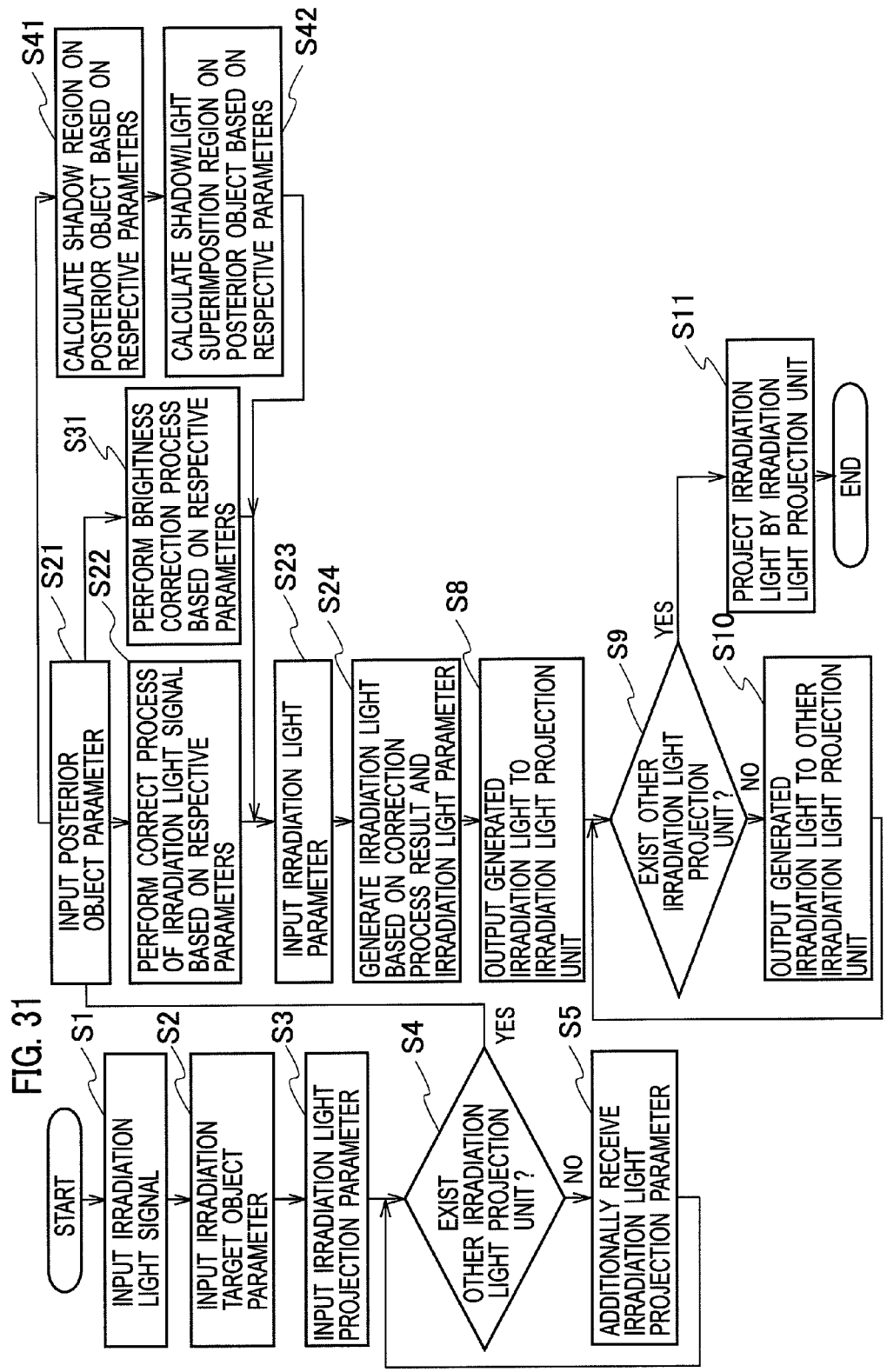
FIG. 31 is a flowchart showing an operation procedure of the another lighting apparatus to which the present invention is applied.

As shown in FIG. 31, after Step S21, the shadow/light superimposition region specifying unit 62 calculates the shadow region formed on the posterior object 30 in Step S41. In Step S42, the shadow/light superimposition region, onto which the irradiation light projected from the other irradiation light projection unit 4 and superimposed on the shadow region concerned is projected, is obtained by the shadow/light superimposition region specifying unit 62.

Figure 32:
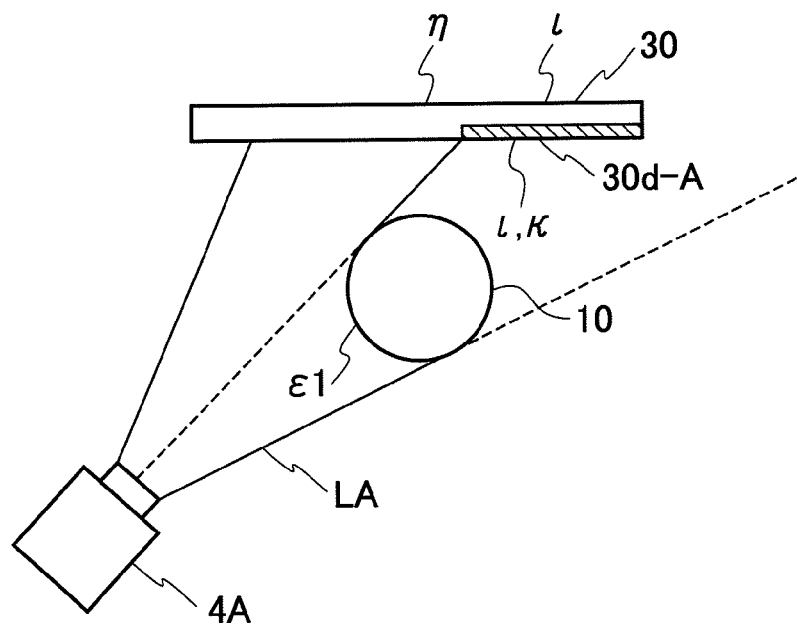
FIG. 32 is a top view showing a state where the irradiation light is projected onto the irradiation target object and the posterior object by the single irradiation light projection unit in the another lighting apparatus to which the present invention is applied.
Figure 33:
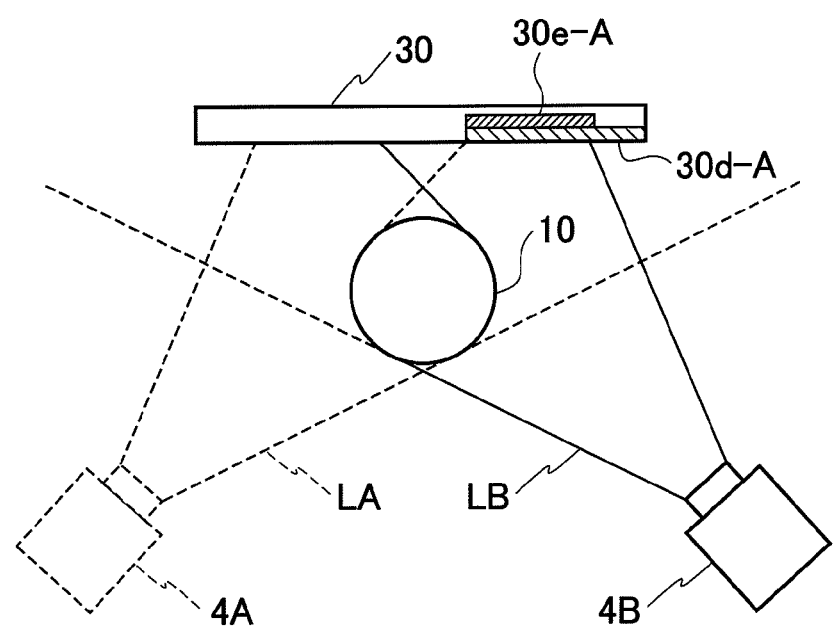
FIG. 33 is a top view showing a state where the irradiation light is projected onto the irradiation target object and the posterior object by the another irradiation light projection unit in the another lighting apparatus to which the present invention is applied.

To be more specific, as shown in FIG. 32, the shadow/light superimposition region specifying unit 62 calculates a shadow region 30d_A (hereinafter, also referred to as a shadow region 30d) of the irradiation target object 10, which occurs on the posterior object 30 when the irradiation light projection unit 4A projects the irradiation light, from the projection angle of view (projection range), position and posture of the irradiation light projection unit 4A, from the shape, position and posture of the irradiation target object 10, and from the shape, position and posture of the posterior object 30. As shown in FIG. 33, the shadow/light superimposition region specifying unit 62 calculates an irradiation region, onto which the irradiation light of the irradiation light projection unit 4B is projected, from the projection angle of view (projection range), position and posture of the irradiation light projection unit 4B, from the shape, position and posture of the irradiation target object 10, and from the shape, position and posture of the posterior object 30. The shadow/light superimposition region specifying unit 62 calculates a shadow/light superimposition region 30e_A (hereinafter, also referred to as a shadow/light superimposition region 30e) in which the irradiation region concerned and the shadow region 30d-A are superimposed on each other.

Figure 34:
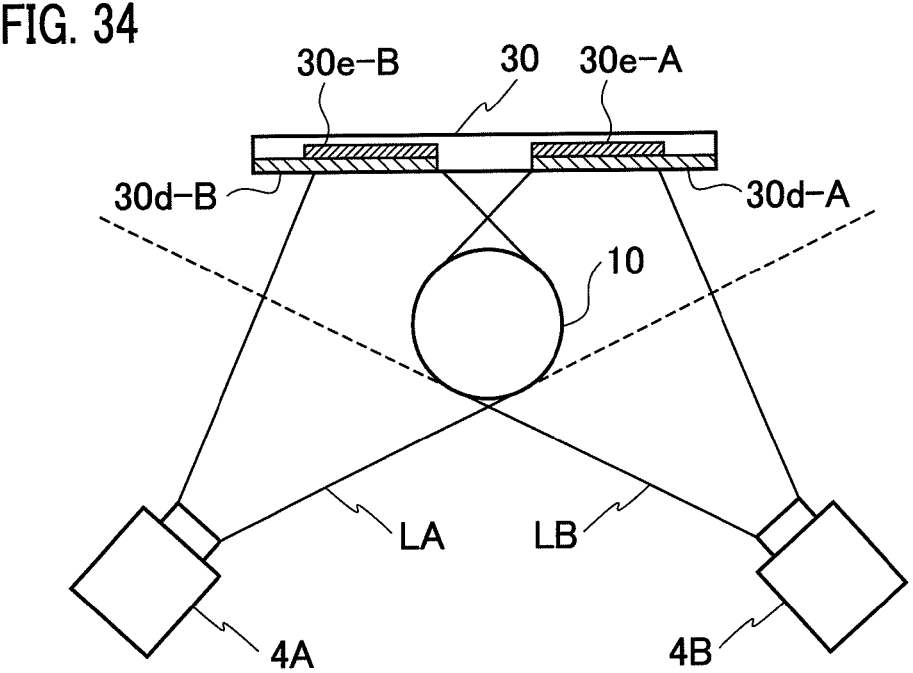
FIG. 34 is a top view showing a state where the irradiation light is projected onto the irradiation target object and the posterior object by the plurality of irradiation light projection units in the another lighting apparatus to which the present invention is applied.

The shadow/light superimposition region specifying unit 62 performs the arithmetic operations as described above for each of the irradiation light projection units 4. In such a way, in a similar way to the shadow region 30d_A and the shadow/light superimposition region 30e_A, which are obtained for the irradiation light projection unit 4A, as shown in FIG. 34, also for the irradiation light projection unit 4B, there are obtained: a shadow region 30d_B on the posterior object 30, which occurs when the irradiation light projection unit 4B projects the irradiation light LB onto the irradiation target object 10; and a shadow/light superimposition region 30e_B in which the irradiation light LA of the irradiation light projection unit 4A is irradiated on the shadow region 30d_B.

By diverting FIG. 32, a description will be made of coordinate arithmetic operations for obtaining the shadow region 30d as described above.

First, a space in which the irradiation target object 10, the irradiation light projection unit 4 and the posterior object 30 are included is designated by the three-dimensional coordinates: α[X, Y, Z] (world coordinates) (not shown). Note that X, Y and Z are coordinates of the respective axes in the three-dimensional direction.

Next, the three-dimensional shape data of the posterior object 30, which is, for example, as shown in FIG. 21, is created, and the surface region of the posterior object 30 is expressed by three-dimensional coordinates: $\eta o[x(h), y(h), z(h)]$. The three-dimensional coordinates: $\eta o[x(h), y(h), z(h)]$ of the surface of the posterior object 30 are subjected to the coordinate transformation in response to the position and posture thereof in the three-dimensional coordinate space a.

In such a way, shape coordinates: $\eta[x(h), y(h), z(h)]$ of the surface of the posterior object 30 in the three-dimensional coordinate space $\alpha$ are calculated.

Next, a linear expression that connects the center (optical center) of the irradiation light projection unit 4A and the coordinate region $\epsilon1[x1(e), y1(e), z1(e)]$ in which the irradiation light is projected onto the irradiation target object 10 to each other is calculated, and a coordinate region: $\lfloor[x(i), y(i), z(i)]$ included in the linear expression concerned is extracted from the shape coordinates: $\eta[x(h), y(h), z(h)]$ of the surface of the posterior object 30. This coordinate region: $\lfloor$ specifies the shadow region 30d, in which the irradiation onto the posterior object 30 is shaded by the existence of the irradiation target object 10, in the projection region of the irradiation light projection unit 4. However, the coordinate region: $\lfloor$ includes the front side of the posterior object 30, on which the shadow region 30d occurs, and the back side of the posterior object 30, on which the shadow region 30d does not occur, and accordingly, it is necessary to remove the coordinates on the back side. Therefore, a linear expression that connects the center (optical center) of the irradiation light projection unit 4 and the coordinate region: $\lfloor[x(i), y(i), z(i)]$ to each other is calculated, and in the case where the same linear expression is calculated, only the coordinate that is the closest to the irradiation light projection unit 4 is left remained, and the other coordinates are removed. In such a way, the coordinate region on the front side on which the shadow region 30d occurs can be extracted as a coordinate: $\kappa[x(j), y(j), z(j)]$ of the shadow region 30d that occurs on the posterior object 30. The coordinate: $\kappa[x(j), y(j), z(j)]$ of the shadow region 30d, which is thus obtained, is collated with an irradiation region obtained for another irradiation light projection unit 4, and a portion in which both of the irradiation regions coincide with each other is extracted as the shadow/light superimposition region 30e.

As described above, in the background light of the irradiation light projected from the irradiation light projection unit 4, the shadow/light superimposition region 30e that can cover the shadow region 30d that occurs by the irradiation light of the other irradiation light projection unit 4 can be specified. In such a way, the lighting apparatus can arbitrarily set the color and the brightness on the shadow/light superimposition region 30e by the brightness correction by the second brightness correction unit 61 and by the irradiation light parameter set by Step S23, and can project the irradiation light.

As described above, in accordance with the lighting apparatus, the plurality of irradiation light projection units 4 are used, whereby it becomes possible to project the irradiation light of the other irradiation light projection unit 4 onto the shadow region 30d on the posterior object 30, which occurs in the case where the irradiation light of one of the irradiation light projection units 4 is projected onto the irradiation target object 10. In such a way, for example as shown in FIG. 34, the irradiation light projection units 4A and 4B are arranged at positions where the mutual shadow regions (30d_A, 30d_B) can be covered thereby, whereby the shadow regions (30d_A, 30d_B) behind the irradiation target objet 10 can be completely deleted by the irradiation light.

Note that a large number of the irradiation light projection units 4 are used, whereby a space can be constructed, in which the shadow region 30d does not exist on any place of the irradiation target object 10 and the posterior object 30. Moreover, by the irradiation light characteristic setting unit 23, the characteristics (color and brightness) of the irradiation light to be projected onto the shadow/light superimposition region 30e can be set arbitrarily. In such a way, not only the shadow region 30d is deleted, but also irradiation light of a different color can be projected onto the shadow region 30d, and the brightness of the shadow region 30d can be increased or reduced.

Figure 36:
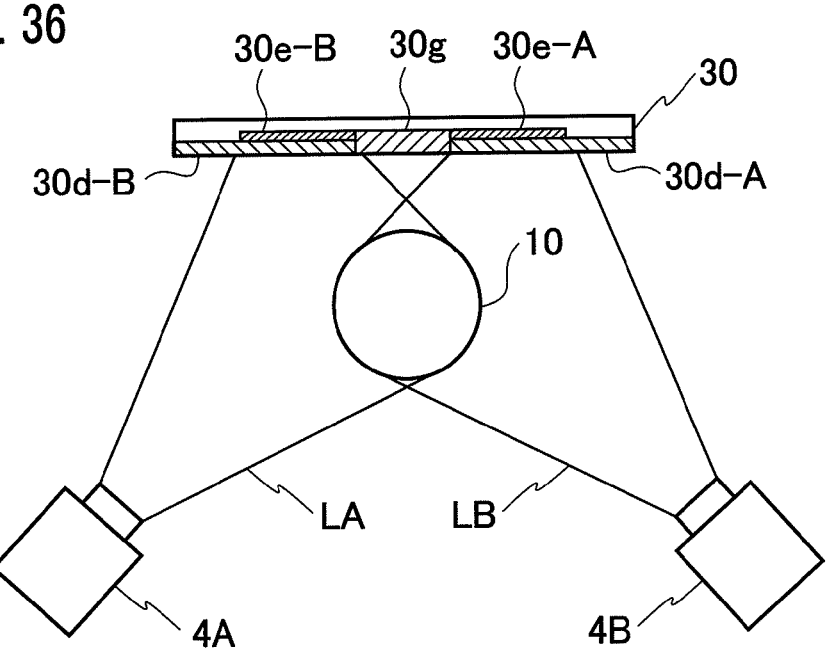
FIG. 36 is a top view showing a state where the irradiation light is projected onto the irradiation target object and the posterior object by the plurality of irradiation light projection unit in the another lighting apparatus to which the present invention is applied.

It is desirable that the second brightness correction unit 61 that can adjust the brightness and the like of the shadow/light superimposition region 30e as described above also correct the brightness of the irradiation light projected from each of the irradiation light projection units 4A and 4B so that irradiation light to be projected onto a superimposition region 30g onto which both of the irradiation light projection units 4A and 4B project the irradiation light LA and the irradiation light LB can achieve even brightness in the vicinity of a boundary of the superimposition region 30g as shown in FIG. 36.

Figure 35:
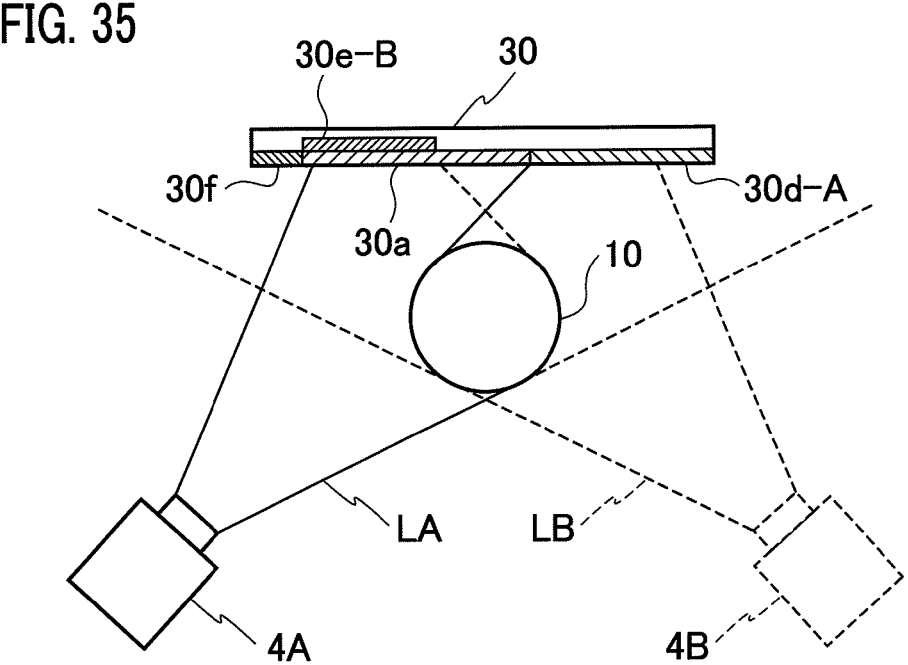
FIG. 35 is a top view showing a state where the irradiation light is projected onto the irradiation target object and the posterior object by the single irradiation light projection unit in another lighting apparatus to which the present invention is applied.

As shown in FIG. 35, in the case where the irradiation light is projected onto the posterior object 30 by the irradiation light projection unit 4A under a situation where the irradiation light projection unit 4A, the irradiation target object 10 and the posterior object 30 are arranged, the surface of the posterior object 30 is classified into the background light projection region 30a, an outside-of-irradiation-region region 30f, and the shadow region 30d unprojectable by the irradiation target objet 10.

In this case, as shown in FIG. 36, the lighting apparatus can obtain the shadow/light superimposition region 30e_B from the background light projection region of the irradiation light projection unit 4A and the shadow region 30d_B, and by obtaining the shadow/light superimposition region 30e_A from the background light projection region of the irradiation light projection unit 4B and the shadow region 30d_A, can obtain the superimposition region 30g in which the plural pieces of irradiation light are superimposed on each other on the posterior object 30. Then, the second brightness correction unit 61 corrects the brightness for the irradiation light signal corresponding to the irradiation light irradiated onto the superimposition region 30g. In such a way, even brightness can be achieved on the shadow/light superimposition region 30e adjacent to the superimposition region 30g. In such a way, unevenness in brightness on the posterior object 30 is suppressed, and the projection onto the posterior object 30 can be performed with even brightness.

Figure 37:
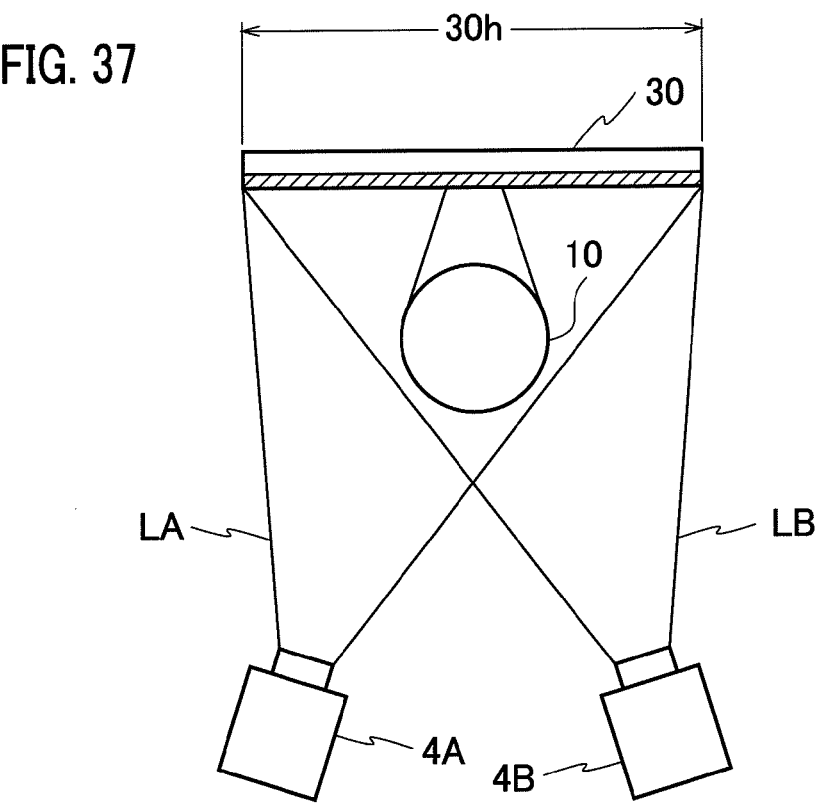
FIG. 37 is a top view showing a state where the irradiation light is projected toward the same superimposition projection region by the plurality of irradiation light projection units in the another lighting apparatus to which the present invention is applied.

Moreover, as shown in FIG. 37, the above-mentioned lighting apparatus calculates a region in which the irradiation target object 10 and the posterior object 30 are included, and arranges the plurality of irradiation light projection units 4 so that the region concerned and a superimposition projection region 30h of the plurality of irradiation light projection units 4 can coincide with each other. In other words, two or more irradiation light projection units 4A and 4B are arranged so that a projectable range defined by the projection angle of view of each of the irradiation light projection units 4 can include the superimposition projection region 30h. Here, the irradiation light projection units 4A and 4B can project the irradiation light onto the same superimposition projection region 30h only in such a manner that the lighting apparatus performs the correction processing in conformity with the posterior object 30 viewed individually from the irradiation light projection units 4A and 4B.

Figure 38:
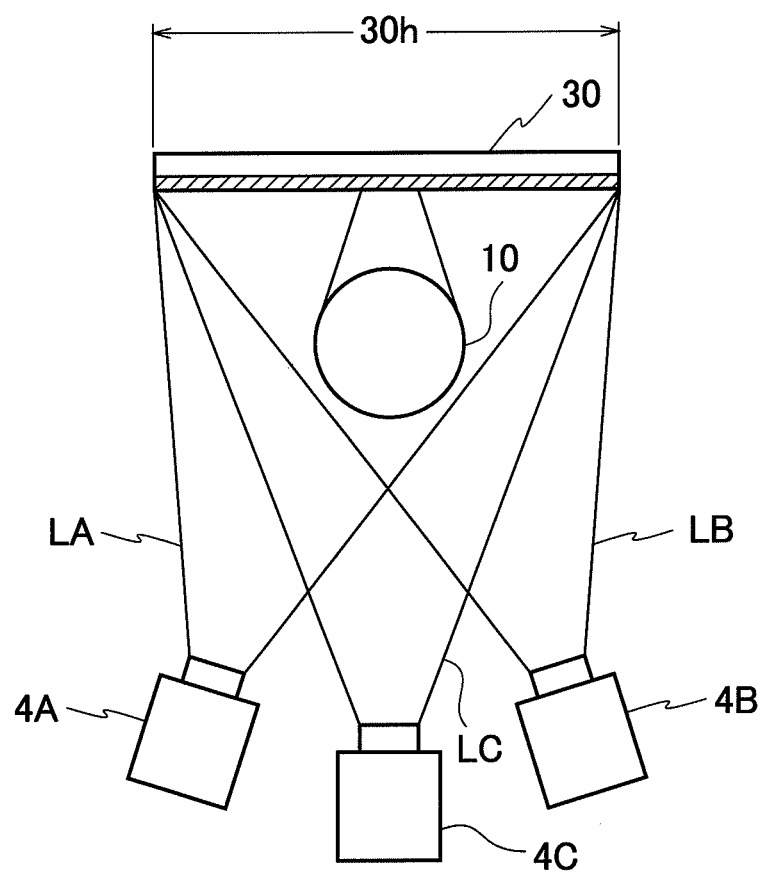
FIG. 38 is a top view showing a state where the irradiation light is projected toward the same superimposition projection region by a larger number of the irradiation light projection units in the another lighting apparatus to which the present invention is applied.

In such a way, as shown in FIG. 38, the irradiation light projection units 4 are increased in a state where such an irradiation target region is covered with a projectable range by the irradiation light projection units 4. In such a way, the brightness can be increased for the entirety of the superimposition projection region 30h. Hence, an observer who views the irradiation target object 10 and the posterior object 30 can observe the irradiation target object 10 and the posterior object 30, which are projected by the plural pieces of irradiation light, as if the irradiation light were outputted from one irradiation light projection unit 4.

Moreover, it is desirable that this lighting apparatus perform video distortion correction processing using a viewpoint position of the observer as a correction parameter. In this correction processing, in the case where there is a viewpoint position for the irradiation target object, which is recommended in advance, a correction table for correcting a video distortion at the time when each of the irradiation target object 10 and the posterior object 30 is observed from the viewpoint position concerned is stored in a memory(not shown) in advance, and the correction table is referred to. Then, in the case of being supplied with the irradiation light signals, the lighting apparatus performs the coordinate transformation for the respective pixels for each of the irradiation light signal corresponding to the coating light and the irradiation light signal corresponding to the background light among the irradiation light signals in accordance with the correction table. Then, the lighting apparatus forms a video free from the video distortion. In such a way, the lighting apparatus can distort video light so that, in the case where the video projected onto the irradiation target object 10 is visually recognized from the viewpoint position of the observer, the video concerned can be observed free from distortion.

Moreover, in the case of receiving a value obtained by measuring the viewpoint position of the observer, this lighting apparatus may calculate a viewpoint position parameter from the value thus measured. In such a way, the lighting apparatus can generate coating light that coats the irradiation target object 10 so that the irradiation target object 10 can be observed free from distortion from the viewpoint position even after the viewpoint position moves, and can generate background light for the posterior object 30 so that the posterior object 30 can be observed free from distortion.

In such a way, even if not the irradiation light but the video is projected onto the irradiation target object 10 and the background object 30, the video can be allowed to be visually recognized free from distortion. For example, a video of a commercial article as a target is displayed on the irradiation target object 10 that simulates a shape of the commercial article, and an explanation video of the commercial article and the like are displayed on the background object, whereby a presentation of the commercial article can be implemented. Moreover, a video of furniture, an electric appliance or the like is displayed on the irradiation target object 10 that simulates a shape of the furniture, the electric appliance or the like, and a video of a room interior space is displayed on the posterior object 30, whereby a virtual showroom can be implemented. The videos are displayed as described above, whereby not the simple lighting onto the object but virtual space direction, design review and the like are realized.

Moreover, the lighting apparatus emits plural pieces of video light, which are given a mutual parallax, by the plurality of irradiation light projection units 4, thereby can also display a three-dimensional video on the irradiation target object 10 and the posterior object 30. In this case, the lighting apparatus supplies irradiation light signals for displaying the three-dimensional video to the irradiation light projection units 4, and allows the video projected onto the irradiation target object 10 and the posterior object 30 to be observed as a three-dimensional object. This lighting apparatus generates an irradiation light signal for a right eye and an irradiation light signal for a left eye, which are given the mutual parallax, by the irradiation light signal input unit 1, and implements the correction processing for the respective irradiation light signals.

In this case, the lighting apparatus allows the observer to wear polarization glasses in which polarization directions of the transmitting video light are different between the right eye and the left eye, and emits plural types of irradiation light, which are given the mutual parallax and are different in polarization direction, from the irradiation light projection units 4 by a polarization mode or a time division mode. In the case of displaying the three-dimensional video on the irradiation target object 10 and the posterior object 30 by the polarization mode, the one made of a raw material (painted silver) of holding the polarization direction of the video light is used as a surface material of the irradiation target object 10 and the posterior object 30, and the irradiation light for the right eye and the irradiation light for the left eye, which are different in polarization direction from each other, are emitted from two light emission ports of the irradiation light projection units 4. Moreover, in the case of displaying the three-dimensional video on the irradiation target object 10 and the posterior object 30 by the time division mode, the irradiation light for the right eye and the irradiation light for the left eye are alternately emitted in time division from one light emission port, and emission timing of the irradiation light for the right eye and the irradiation light for the left eye and switching timing of right-eye and left-eye shutters of liquid crystal shutter glasses are synchronized with each other.

In such a way, in accordance with this lighting apparatus, the observer can be allowed to observe, free from distortion, the three-dimensional video on the irradiation target object 10 and the posterior object 30.

Note that the above-mentioned embodiments are merely examples of the present invention. Therefore, the present invention is not limited to the above-mentioned embodiments, and it is a matter of course that, besides the above-mentioned embodiments, a variety of alterations are possible in response to design and the like within the scope without departing from the technical spirit of the present invention.

INDUSTRIAL APPLICABILITY

In accordance with the lighting apparatus according to the present invention, the irradiation target object having the arbitrary shape can be coated with the irradiation light with high accuracy by using the plurality of irradiation light projecting means.

The invention claimed is:

1. A lighting apparatus that projects irradiation light toward an irradiation target object having an arbitrary shape, comprising:
   a memory storing an irradiation light signal inputting receiver, a coating corrector, an irradiation light generator, a coating corrector input interface;
   plurality of irradiation light projectors configured to project the irradiation light onto the irradiation target object;
   the irradiation light signal inputting receiver configured to receive an irradiation light signal;
   the coating corrector configured to correct the irradiation light signal received by the irradiation light signal inputting receiver so that the irradiation target object can be coated with the irradiation light when the irradiation light is irradiated onto the irradiation target object( ); and
   the irradiation light generator configured to generate irradiation light by using the irradiation light corrected by the coating corrector, and projecting the irradiation light from the plurality of irradiation light projectors; and
   the coating corrector input interface that enables the coating corrector to acquire a target object parameter, including a three-dimensional shape, position, and posture of the irradiation target object, and that enables the coating corrector to acquire an irradiation light projection parameter, including a position and posture of each of the plurality of irradiation light projectors, which enables the irradiation light generator to generate a coating light for projection only onto the irradiation target object and to generate a background light for projection only onto a region other than the irradiation target object, wherein the coating corrector includes a first irradiation fight signal corrector configured to correct the irradiation fight signal for each of the plurality of irradiation fight projectors in accordance with an outline of the irradiation target object, and to correct the irradiation fight signal so as to coat the irradiation target object in many directions with the irradiation fight irradiated from the plurality of irradiation fight projectors, the outline being viewed from each of the plurality of irradiation fight projectors and based on an irradiation target object parameter including a three-dimensional shape, position and posture of the irradiation target object and on an irradiation fight projection parameter including a position and posture of each of the plurality of irradiation fight projectors, and the irradiation fight generator generates plural pieces of the irradiation fight by using the irradiation fight signal for each of the plurality of irradiation fight projectors, the irradiation fight signal being corrected by the first irradiation fight signal corrector.

2. The lighting apparatus according to claim 1,
wherein the plurality of irradiation light projectors are arranged so that projection regions obtained by dividing a surface of the irradiation target object are set for each of the plurality of irradiation light projectors when the irradiation light is irradiated onto each of the divided regions by each of the plurality of irradiation light projectors, the plural pieces of irradiation light projected by different irradiation light projectors can be superimposed on each other in a region including a boundary between adjacent divided regions.

3. The lighting apparatus according to claim 1, further comprising:
a second irradiation light signal corrector configured to correct the irradiation light signal so as to divide the irradiation light irradiated by each of the plurality of irradiation light projectors into coating light that coats the irradiation target object and background light that becomes a background of the irradiation target object based on a posterior object parameter including a three-dimensional shape, position and posture of a posterior object having an arbitrary shape, the posterior object existing behind the irradiation target object; and
an irradiation light characteristic setter configured to set irradiation light characteristics for each irradiation light signal that indicates the coating light being corrected by the second irradiation light signal corrector and the irradiation light signal that indicates the background light, and for generating irradiation light including the coating light and the background light by the irradiation light generator.

4. The lighting apparatus according to claim 3,
wherein the plurality of irradiation light projectors are arranged so that, projection regions obtained by dividing a surface of the posterior object are set for each of the plurality of irradiation light projectors, when the irradiation light is irradiated onto each of the divided regions by each of the plurality of irradiation light projectors, the plural pieces of irradiation light projected by different irradiation light projectors can be superimposed on each other in a region including a boundary between the adjacent divided regions.

5. The lighting apparatus according to claim 2, further comprising:
a first brightness corrector configured to calculate a superimposition region in which the coating light and the posterior light, both of the light being irradiated from the different irradiation light projectors, are superimposed on each other, and for correcting brightness of the irradiation light projected from each of the plurality of irradiation light projectors so that brightness of the irradiation light in a vicinity of a boundary of the superimposition region can become even.

6. The lighting apparatus according to claim 3, further comprising:
a shadow region calculator configured to calculate a shadow region that occurs on the posterior object in a case of irradiating, onto the irradiation target object, the irradiation light projected from at least one of the plurality of irradiation light projectors; and
a shadow superimposition range calculator configured to calculate a shadow superimposition range as the shadow region superimposed on an irradiation region onto which the irradiation light is projected from another one of the plurality of irradiation light projectors, the shadow superimposition range being included in the shadow region calculated by the shadow region calculator,
wherein the irradiation light characteristic setter sets irradiation light characteristics of irradiation light to be projected onto the shadow superimposition range calculated by the shadow superimposition range calculator, and
the irradiation light generator sets the irradiation light characteristics of the irradiation light to be projected onto the shadow superimposition range, the irradiation light characteristics being set by the irradiation light characteristic setter.

7. The lighting apparatus according to claim 6, further comprising:
a second brightness corrector configured to calculate a superimposition region of plural pieces of irradiation light to be projected onto the posterior object from the plurality of irradiation light projectors, and for correcting brightness of the irradiation light projected from each of the plurality of irradiation light projectors so that brightness of the irradiation light in a vicinity of a boundary of the superimposition region can become even.

8. The lighting apparatus according to claim 1,
wherein a region in which the irradiation target object and the posterior object are included is calculated, the plurality of irradiation light projectors are arranged so as to allow the calculated region and projection regions of the plurality of irradiation light projectors to coincide with each other, and the plural pieces of irradiation light irradiated from the irradiation light projector are superimposed on one another.

9. The lighting apparatus according to claim 1,
wherein the irradiation light signal inputting receiver receives, as the irradiation light signal, a video light signal that updates an image on a time axis, and
the lighting apparatus further comprises:
a viewpoint position receiver configured to receive a viewpoint position of an observer who observes the irradiation target object; and a distortion corrector, in a case where a video projected onto the irradiation target object is visually recognized from the viewpoint position of the observer, the viewpoint position having been received by the viewpoint position receiver, for correcting the video light signal so as to distort light of the video in order to allow the video to be observed free from distortion.

10. The lighting apparatus according to claim 9,
wherein the plurality of irradiation light projectors emits, from one or a plurality of video light emitters, plural pieces of video light given a mutual parallax, and displays a three-dimensional video on the irradiation target object.

* * * * *